(12) United States Patent
Sherburne

(10) Patent No.: US 12,082,727 B2
(45) Date of Patent: *Sep. 10, 2024

(54) INSULATED BEVERAGE CONTAINER

(71) Applicant: Paul Sherburne, St. Louis Park, MN (US)

(72) Inventor: Paul Sherburne, St. Louis Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,648

(22) Filed: Aug. 2, 2023

(65) Prior Publication Data

US 2023/0371727 A1 Nov. 23, 2023

Related U.S. Application Data

(63) Continuation of application No. 18/127,083, filed on Mar. 28, 2023, now Pat. No. 11,751,707, which is a continuation of application No. PCT/US2021/056958, filed on Oct. 28, 2021.

(60) Provisional application No. 63/220,867, filed on Jul. 12, 2021, provisional application No. 63/107,409, filed on Oct. 29, 2020.

(51) Int. Cl.
*A47G 23/02* (2006.01)
*B65D 81/38* (2006.01)

(52) U.S. Cl.
CPC ..... *A47G 23/0233* (2013.01); *B65D 81/3881* (2013.01); *A47G 2023/0283* (2013.01)

(58) Field of Classification Search
CPC ............ B65D 81/3876; B65D 81/3879; B65D 81/3881; B65D 81/3886; A47G 23/02; A47G 23/0208; A47G 23/0216; A47G 23/0266; A47G 23/04; A47G 2023/0275; A47G 2023/0283; A47G 2023/0291

See application file for complete search history.

(56) References Cited

U.S. PATENT DOCUMENTS

| | | |
|---|---|---|
| 1,647,427 A | 11/1927 | Andrews |
| 2,446,451 A | 8/1948 | Allen |
| 2,497,197 A | 2/1950 | Allen |
| 3,596,795 A | 8/1971 | Ercoli |
| 3,755,030 A | 8/1973 | Doman et al. |
| 3,766,975 A * | 10/1973 | Todd .............. A47G 19/2288 165/47 |
| 3,807,194 A | 4/1974 | Bond |
| 4,850,496 A | 7/1989 | Rudell et al. |
| 4,974,741 A | 12/1990 | Gustafson et al. |

(Continued)

*Primary Examiner* — Javier A Pagan

(57) ABSTRACT

Various embodiments concern a handheld beverage container. The beverage container includes a vacuum chamber located radially between an inner tubular sidewall and an outer tubular sidewall and axially between an inner bottom wall and an outer bottom wall. The combined heat capacity of both of the inner tubular sidewall and the inner bottom wall can be greater than the combined heat capacity of both of the outer tubular sidewall and the outer bottom wall such that a vacuum insulated thermal reserve is formed. Heat can be exchanged between the thermal reserve and the beverage to stabilize the temperature of the beverage to counteract ambient cooling/heating of the beverage. Various embodiments concern a cap that seals with a disposable cup that is held within a container body, allowing a beverage to be contained in the disposable cup while being insulated by the container body, with or without a thermal reserve.

20 Claims, 13 Drawing Sheets

(56) References Cited

U.S. PATENT DOCUMENTS

| | | |
|---|---|---|
| 5,040,719 A | 8/1991 | Ballway |
| 5,243,835 A | 9/1993 | Padamsee |
| 5,385,255 A | 1/1995 | Varano et al. |
| 5,508,494 A | 4/1996 | Sarris et al. |
| 6,056,144 A | 5/2000 | Strange et al. |
| 6,367,652 B1 | 4/2002 | Toida et al. |
| 6,588,621 B2 | 7/2003 | Shimazaki |
| 6,626,326 B2 | 9/2003 | Murakami |
| 6,761,041 B2 | 7/2004 | Roth |
| 7,089,749 B1 | 8/2006 | Schafer |
| 7,118,005 B2 | 10/2006 | Shimazaki |
| 7,156,253 B2 | 1/2007 | Ziegler |
| 7,410,075 B2 | 8/2008 | Killoren |
| 7,497,349 B2 | 3/2009 | Allen |
| 7,686,183 B2 | 3/2010 | Ziegler |
| 8,205,468 B2 | 6/2012 | Hemminger |
| 8,561,834 B2 | 10/2013 | Ziegler |
| 9,452,876 B2 | 9/2016 | Anelevitz |
| 9,555,949 B1 | 1/2017 | French et al. |
| 9,585,501 B1 | 3/2017 | Hamelink et al. |
| 9,783,359 B2 | 10/2017 | D'Amato |
| 9,814,331 B2 | 11/2017 | Alexander |
| 9,930,982 B2 | 4/2018 | Matsui |
| 10,005,608 B1 | 6/2018 | Jacob |
| 10,059,488 B2 | 8/2018 | Chiriga |
| 10,093,462 B2 | 10/2018 | McArthur |
| 10,279,721 B1 | 5/2019 | Nelson |
| 10,316,235 B2 | 6/2019 | Narine |
| 10,398,244 B2 | 9/2019 | Ziegler et al. |
| 10,457,471 B2 | 10/2019 | Jacob |
| 10,549,902 B1 | 2/2020 | Brown |
| 10,595,654 B2 | 3/2020 | Booska |
| 10,835,067 B2 | 11/2020 | Rane |
| 11,033,133 B2 | 6/2021 | O'Hare et al. |
| 11,089,906 B2 | 8/2021 | Haas |
| 11,129,499 B2 | 9/2021 | Tolman |
| 11,375,835 B2 * | 7/2022 | Sherburne .......... A47G 23/0233 |
| 2002/0088810 A1 * | 7/2002 | Murakami .......... B65D 81/3881 |
| | | 220/739 |
| 2003/0192891 A1 | 10/2003 | Ziegler |
| 2004/0124196 A1 | 7/2004 | Ziegler |
| 2006/0043250 A1 | 3/2006 | Farrell |
| 2006/0156756 A1 | 7/2006 | Becke |
| 2006/0219858 A1 | 10/2006 | Iacovino |
| 2008/0190942 A1 | 8/2008 | Fujii et al. |
| 2009/0266737 A1 | 10/2009 | Cole |
| 2010/0108693 A1 | 5/2010 | Zhang et al. |
| 2010/0264154 A1 | 10/2010 | Pitcher et al. |
| 2010/0301109 A1 | 12/2010 | Lewis et al. |
| 2011/0233219 A1 | 6/2011 | Proskey |
| 2012/0074145 A1 | 3/2012 | Chang |
| 2013/0221013 A1 | 8/2013 | Kolowich et al. |
| 2013/0248537 A1 | 9/2013 | Lane |
| 2014/0158848 A1 | 6/2014 | Caruso et al. |
| 2015/0191293 A1 * | 7/2015 | Forcella .......... A47G 23/0233 |
| | | 220/592.16 |
| 2015/0197390 A1 | 7/2015 | Kurabe et al. |
| 2016/0096662 A1 | 4/2016 | Lin |
| 2016/0185588 A1 | 6/2016 | Huber et al. |
| 2017/0119186 A1 | 5/2017 | Rivera |
| 2017/0297805 A1 | 10/2017 | Yaguchi et al. |
| 2018/0242765 A1 * | 8/2018 | Rane .................. A47G 23/0266 |
| 2020/0017280 A1 * | 1/2020 | Callinan .......... B65D 81/3879 |
| 2020/0062488 A1 | 2/2020 | Jacob |
| 2022/0119188 A1 | 4/2022 | Welle |

* cited by examiner

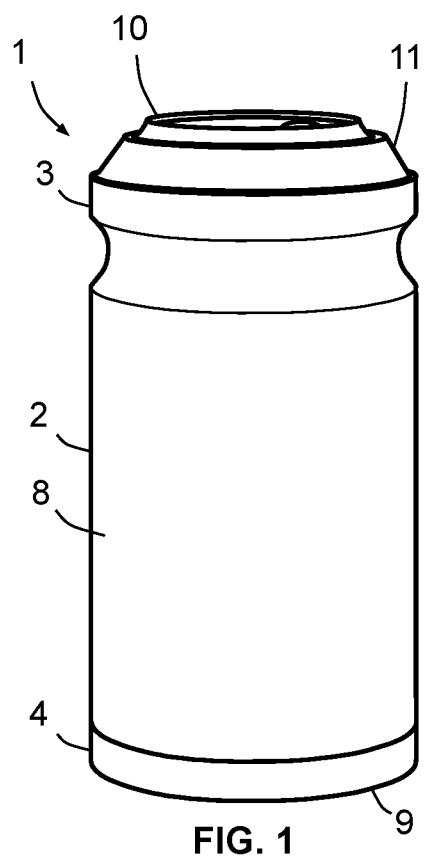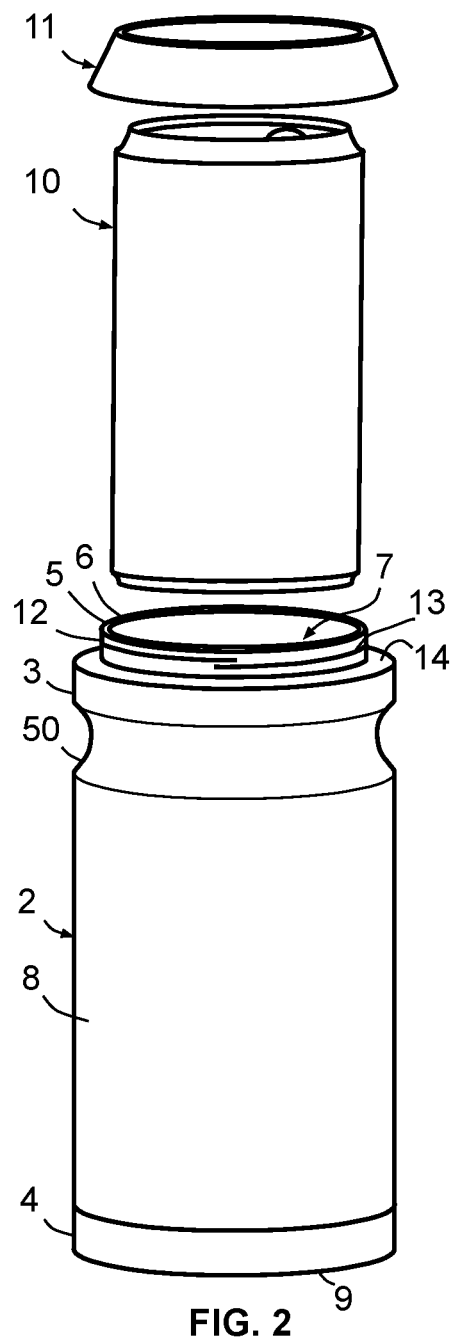
FIG. 1
FIG. 2

INSULATED BEVERAGE CONTAINER

CROSS-REFERENCE TO RELATED APPLICATIONS

This application is a continuation of U.S. Utility patent application Ser. No. 18/127,083 filed Mar. 28, 2023 and entitled "INSULATED BEVERAGE CONTAINER", which is a continuation of International PCT Application No. PCT/US2021/056958 filed Oct. 28, 2021 and entitled "INSULATED BEVERAGE CONTAINER", which claims the benefit of priority of U.S. Provisional Application No. 63/107,409 filed Oct. 29, 2020, and entitled "VACUUM INSULATED BEVERAGE CONTAINER HAVING INTERNAL THERMAL RESERVE" and of U.S. Provisional Application No. 63/220,867 filed Jul. 12, 2021, and entitled "BEVERAGE CONTAINER HAVING VACUUM INSULATED INTERNAL THERMAL RESERVE", the disclosures of which are hereby incorporated by reference in their entireties. U.S. Pat. No. 11,375,835 claims priority to these same PCT/provisional applications, but no priority claim to that patent is made herein.

BACKGROUND

Vacuum insulated containers have been used for keeping beverages and other consumables hot or cold. A double-walled container having a vacuum chamber between the two walls can keep a beverage cold or hot for hours by minimizing loss of heat through the double walls due to the intermediary vacuum chamber through which thermal energy cannot conduct. The dual walls are typically made to be thin to reduce the weight of the handheld container and also minimize material costs. There are several factors that motivate a thicker outer wall and a thinner inner wall. For example, the outer wall may be made thicker to increase the durability of the container during falls and general use. The inner wall may unwantedly transfer heat with the beverage, such as a cold beverage receiving heat from the ambient temperature inner wall or a hot beverage losing heat to the ambient temperature inner wall, thus motivating a design need for a thin inner wall. The result is that conventional vacuum insulated containers have inner and outer walls of equal thickness and typically as thin as possible, or to the extent a wall is thickened, then the outer wall is reinforced. The present disclosure reverses this convention, as further discussed herein, and also presents options for vacuum insulating disposable cups.

SUMMARY

Conventional vacuum insulated beverage containers have inner and outer walls of equal thickness, or have an outer wall of greater thickness. Various vacuum insulated beverage containers of the present disclosure have an inner wall that has a higher heat capacity than the outer wall. The inner wall can be thicker than the outer wall, and in some cases the inner wall may contain material having an especially high heat capacity. The inner wall can then function as a thermal reserve, either sinking or supplying thermal energy to stabilize the temperature of the beverage. Furthermore, a vacuum chamber is positioned axially and radially between the inner and outer walls to insulate the thermal reserve so that essentially all of the cooling or heating capacity of the thermal reserve is used on the beverage. The thermal isolation of the thermal reserve, except through the beverage, means that heat is transferred between the thermal reserve and the beverage only to the extent that the beverage warms or cools from ambient air.

When a cold beverage is desired, the beverage container is intended to be cooled prior to receiving the beverage so that the inner wall charges up as a thermal reserve. The beverage is then introduced into the beverage container. The thermal reserve absorbs excess heat from the beverage as the beverage warms over time, slowing the time in which the beverage approaches ambient temperature. In some cases, the beverage container can be stored at freezer temperature and the beverage can be stored at ambient temperature, such that when combined the thermal reserve absorbs substantial heat from the beverage to lower the beverage to a chilled temperature. In such use, only the beverage container needs to be pre-cooled and a variety of beverage options can be stored at ambient temperature, allowing the consumer to select the beverage for chilling instead of pre-chilling all beverages, saving on cooling capacity. The outer wall being relatively thinner means it will approach ambient temperature much faster (if cooled) and therefore be comfortable to hold, even if originally lowered to freezer temperature. The inner wall being thicker means it functions as a vacuum insulated thermal reserve. The inner wall may be solid metal or may contain a medium (e.g., a liquid or a gel) that serves as a thermal reserve.

When a hot beverage is desired, the inner wall of the beverage container is intended to be heated prior to receiving the beverage, or the beverage container is filled with an overly hot beverage that transfers heat to thermal reserve. As the beverage cools, the thermal reserve transfers heat to the beverage as the beverage cools over time.

A thermal reserve being located within the vacuum chamber of the container means that the thermal energy of the thermal reserve flows predominantly or exclusively through the beverage to stabilize the temperature of the beverage and is not otherwise lost except to the extent it is lost through the beverage via a container opening. Therefore, the heat differential of the thermal reserve can be used exclusively for stabilizing the temperature of the beverage. Being that the thermal reserve is radially and axially within a vacuum chamber, heat transfers between the thermal reserve and the beverage only as needed to the extent that the beverage unavoidably cools or warms through the opening. As such, the thermal reserve is used to counteract the thermal loss through the container opening. Conventional vacuum insulated beverage containers do not include such a thermal reserve, and as such, various embodiments of the present disclosure can stabilize the temperature of a beverage for longer than a conventional vacuum insulated beverage container. Moreover, the vacuum chamber surrounding the hold makes the beverage container tolerable for the user to hold despite the high or low temperature of the thermal reserve. These and other aspects are further discussed herein.

Cap features are also disclosed herein for mounting on a container body. Such cap can seal a disposable cup in vacuum insulated beverage container. In this way, a beverage can be sold or otherwise dispensed in a common disposable cup (e.g., a paper cup sold at coffee shops or a plastic cup containing cola from a restaurant) and the disposable cup can be placed in a container body and then sealed with the cap. The container body can provide vacuum insulation, with or without a thermal reserve. This avoids having to pour the beverage directly into the container body to obtain the benefits of vacuum insulation. The disposable cup can then be removed from the container body, still containing the beverage or empty.

It is noted that this summary section is not a complete overview of all aspects of the present disclosure. The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 1 shows a perspective view of a beverage container assembly including a can.

FIG. 2 shows an unpacked view of the beverage container assembly of FIG. 1.

Figure 3:
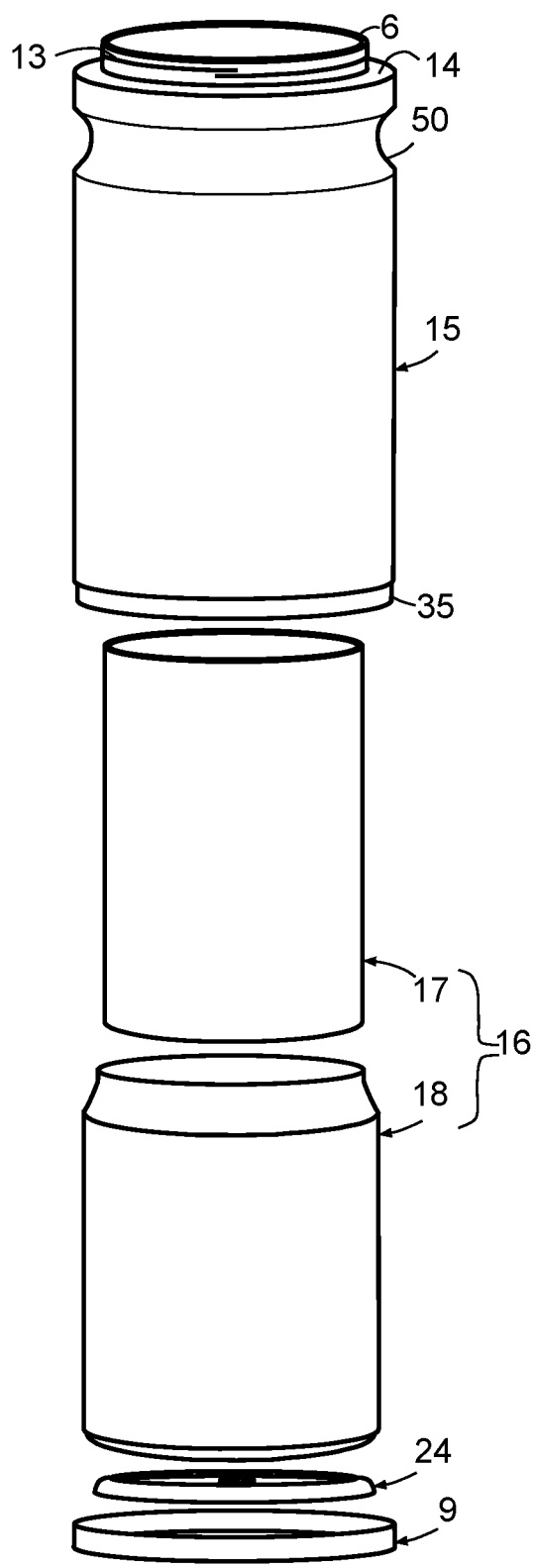
FIG. 3 shows an exploded view of the beverage container of FIGS. 1-2.

While the above-identified figures set forth embodiments of the present invention, other embodiments are also contemplated, as noted in the discussion. In all cases, this disclosure presents the invention by way of representation of possibilities and not limitation. It should be understood that numerous other modifications and embodiments can be devised by those skilled in the art, which fall within the scope and spirit of the principles of the invention. The FIGS. may not be drawn to scale, and applications and embodiments of the present invention may include features, steps and/or components not specifically shown in the drawings.

DETAILED DESCRIPTION

This disclosure uses multiple examples to demonstrate various inventive aspects. The inventive scope of this disclosure is not necessarily limited to any one of these embodiments, nor to all of them in just the manner shown and/or described. Rather, the inventive aspects demonstrated herein can be implemented in various other containers. One aspect or feature shown or described from one embodiment could be implemented on another embodiment in this disclosure even if not shown or described for that embodiment, or various embodiments not illustrated herein. The embodiments illustrated and/or discussed are intended to be illustrative and not limiting, and the described and/or illustrated features can be mixed and matched.

The present disclosure makes use of multiple embodiments to demonstrate various inventive aspects. The embodiments use similar reference numbers and/or descriptions of the components and aspects. An aspect (material, dimensions, functions, relationship to other aspects, etc.) of a component shown and/or described in connection with one embodiment can be present in a similar component of another embodiment even if not explicitly shown or described for the another embodiment, particularly but not exclusively for components of similar reference numbers (e.g., 2, 102, 202, 302, 402, etc. being similar). For the sake of brevity, such common aspects may not be repeated for each embodiment, but may nevertheless be applicable.

For the purpose of facilitating discussion, the following embodiments are discussed in terms of containing a liquid beverage such as soda, beer, milk, or coffee, however these and other teachings can apply to embodiments for containing any scoopable heat sensitive beverages such as soup, yogurt, and ice cream, amongst other foodstuffs.

FIG. 1 shows a perspective view of a beverage container 1. The beverage container 1 is holding a prepackaged beverage canister 10. The beverage container 1 includes a container body 2. The container body 2 can be cylindrical. The container body 2 includes a top end 3 and a bottom end 4. A cap 11 is mounted on the top end 3 of the container body 2 to retain the prepackaged beverage canister 10. The bottom end 4 includes a shoe 9 which supports the beverage container 1, and on which the beverage container 1 stands. When placed on a surface to rest (i.e. not being held by hand), the shoe 9 is typically the only part of the beverage container 1 that makes contact with any surface. When set down, only the shoe 9 may contact the ground surface. The container body 2 includes an exterior surface 8. The exterior surface 8 faces radially away from an axis that extend coaxially through the container body 2. The exterior surface 8 can be round and extend along the axis.

The prepackaged beverage canister 10 can be any type of fluid container for transporting beverages. The prepackaged beverage canister 10 is shown to be cylindrical in this embodiment. The particular example of a prepackaged beverage canister 10 shown is of a can, although a prepackaged beverage canister 10 can be a bottle (e.g., plastic or glass) in various cases. The prepackaged beverage canister 10 is typically sealed with the beverage inside before sale for convenient transport. Such prepackaged beverage canisters 10 are widely used for containing fluids such as soda, juice, beer, energy drinks, or carbonated beverages, amongst other options, for drinking directly out of the prepackaged beverage canister 10 in which the user's lips contact a top lip of the prepackaged beverage canister 10 for drinking from a small opening in the prepackaged beverage canister 10. Such a prepackaged beverage canister 10 is typically sold containing between seven and twenty four fluid ounces of the beverage, most typically twelve fluid ounces. The prepackaged beverage canister 10 is typically disposable in that the prepackaged beverage canister 10 is intended to be used once and then discarded (i.e. recycled or trashed). The cans are typically made from aluminum, although other material options are possible. In the case of cans, the prepackaged beverage canister 10 typically includes a tab opening mechanism (e.g., stay-tab or pop tab), amongst other options, for conveniently opening the prepackaged beverage canister 10 for consumption of the beverage. In the case of bottle, the prepackaged beverage canister typically includes a twist off cap or pry-off bottle cap.

FIG. 2 shows the prepackaged beverage canister 10 having been removed from the beverage container 1. The removal of the prepackaged beverage canister 10 exposes a hold 7 which is an inner cavity configured for containing a beverage one or both of directly or within a prepackaged beverage canister 10. As previously shown in FIG. 1, the cap 11 is fixed to the container body 2 for holding the prepackaged beverage canister 10 within the hold 7, but in FIG. 2 the cap 11 has been dismounted from the container body 2 to permit removal of the prepackaged beverage canister 10 from the hold 7. In this embodiment, the cap 11 threads onto the container body 2. More specifically, the cap 11 includes inner threading that interface with outer threading 13 on a mouth 12 of the container body 2. While threading interface is shown for fixing the cap 11 to the container body 2 for securing the prepackaged beverage canister 10 within the hold 7, other fixation mechanisms can instead be used, such as press fit or latching. In use, the cap 11 can be dismounted from the mouth 12 (e.g., by rotational unthreading of the cap 11 relative to the container body 2) to allow a prepackaged beverage canister 10 to be inserted into the hold 7. After insertion of the prepackaged beverage canister 10 into the hold 7, the cap 11 can be remounted on the mouth 12 (e.g., by rotational threading of the cap 11 relative to the container body 2). The beverage container 1 can be used over and over again, exchanging in and out various standard cans. In this way, the prepackaged beverage canister 10 is disposable while the beverage container 1 can be used repeatedly and indefinitely.

An annular lip 6 is located at the top of the container body 2. The annular lip 6 can be on the end of the mouth 12. The mouth 12 can be on the top-most portion of the container body 2. The lower part of the mouth 12 is connected to an annular ledge 14. The annular ledge 14 represents a reduction in diameter in the container body 2 from the wider exterior surface 8 to the narrower mouth 12. The annular ledge 14 faces upwards in this embodiment. While the annular ledge 12 faces directly upwards in this embodiment, the annular ledge 12 could instead be angled or otherwise sloped. While the mouth 12 is narrower as compared to the exterior surface 8 of the container body 2 in this embodiment due to the annular ledge 14, in some other embodiments the mouth 12 is the same diameter as the exterior surface 8 or otherwise the rest of the container body 2. In some embodiments, the mouth 12 is wider than the exterior surface 8 or otherwise the rest of the container body 2. The height of the mouth 12 (e.g., from the ledge 12 to the lip 6) may be between 0.25-1.50 inches, amongst other heights.

The beverage container 1 includes an opening 5. The opening 5 in this embodiment corresponds with the lip 6 of the container body 2. The opening 5 allows access to the hold 7.

The container body 2 includes an annular groove 50.

FIG. 3 shows an exploded view of the container body 2. While the disassembly shown in FIG. 2 would be common for exchanging prepackaged beverage canisters 10, the disassembly shown in FIG. 3 would not be done during the working life of the container body 2. Such disassembly shown in FIG. 3 would breach and thereby ruin the vacuum chamber and associated insulating function. The container body 2 is formed from a plurality of nested tubes. The tubes (including walls and floors) are typically coaxial about a vertical axis and radially overlapping when finally and permanently assembled during manufacturing.

The container body 2 includes an outer tubular sidewall 15. The outer tubular sidewall 15 can define the exterior surface 8. The outer tubular sidewall 15 can be formed from metal, such as stainless steel or aluminum, such as a single piece of metal. The outer tubular sidewall 15 can form the mouth 12. In the illustrated embodiment, the outer tubular sidewall 15 includes a lower taper 35 which is a reduction in outer diameter. The lower taper 35 is narrowed to fit into the shoe 9. In some embodiments, the outer tubular sidewall 15 may have the same radial thickness, or substantially the same radial thickness, throughout its entire height. In this embodiment, the outer tubular sidewall 15 extends from the lower taper 35 to the lip 6.

As further shown in FIG. 3, the container body 2 includes an inner tubular sidewall 16. The inner tubular sidewall 16 can be formed from metal, such as stainless steel or aluminum. In this embodiment, the inner tubular sidewall 16 is multi-layered. In this embodiment, the inner tubular sidewall 16 includes a side sealing layer 17 and a sleeve 18. In various other embodiments, inner tubular sidewall 16 is a single layer. Each of the side sealing layer 17 and the sleeve 18 are preferably formed from metal, such as stainless steel or aluminum, however other material options are possible.

The container body 2 further comprises an outer bottom wall 24. Outer bottom wall 24 is round. The outer bottom wall 24 can be formed from metal, such as stainless steel or aluminum; however other material options are possible. As further shown herein, the outer bottom wall 24 interfaces with the lower taper 35 of the outer tubular sidewall 15 to seal a vacuum chamber. The lower-most part of the container body 2 is the shoe 9. The shoe 9 can be formed by metal. The outer tubular sidewall 15 engages the shoe 9 by the lower taper 38 fitting into the shoe 9. In an alternative embodiment, the taper 38 is located on the top end of the shoe 9 and fits into the bottom end of the outer tubular sidewall 15.

Figure 4:
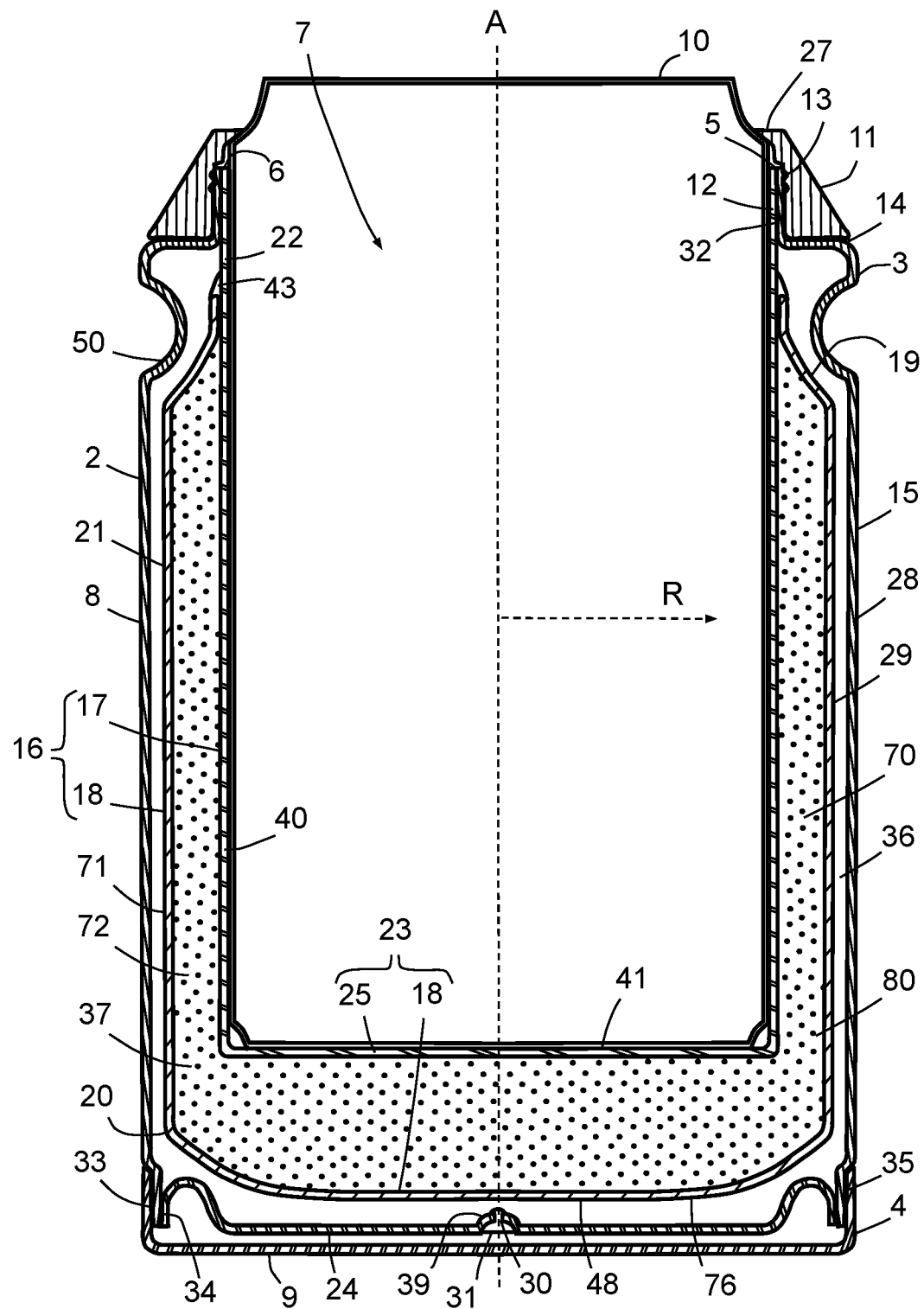
FIG. 4 shows a cross-sectional view of the beverage container of FIGS. 1-3.

FIG. 4 is a cross-sectional side view of the beverage container 1. The section of the beverage container 1 can be taken along its axis. The beverage container 1 can be symmetric around the axis, so the two-dimensional view of FIG. 4 can represents the entire structure 360° around the axis (except where noted, such as for threading pitch). The cross-sectional view corresponds with the configuration of FIG. 1 in which the beverage container 1 is assembled and further includes the prepackaged beverage canister 10 within the hold 7 of the beverage container 1. In various alternative embodiments, the hold 7 is used to directly hold (contact) the beverage instead of the prepackaged beverage canister 10 being intermediary.

The side view of FIG. 4 indicates an axis (along line A). The axis can be a vertical axis, as it is oriented in an up-down orientation. The axis corresponds with the long axis of the beverage container 1, the container body 2, and the prepackaged beverage canister 10. The axis is coaxial with the long axis of the beverage container 1, the container body 2, and the prepackaged beverage canister 10. The axis is vertical. The axis can be in the centerline of the beverage container 1, about which the nested walls are coaxial. Directional references made herein to above, below, higher, lower, height, taller, and shorter are assessed along the axis (or equivalent axis of a different tumbler).

Orthogonal to the axis is a radial direction (along line R). The radial direction projects out from the axis orthogonally.

The radial direction can be 360° about the axis and is not necessarily a single ray projecting orthogonal to the axis in a single orientation. As such, radially can refer to being orthogonally outward from the axis. An aspect described as radial can be along the radial direction. Radially inward can be towards the axis while radially outward can be away from the axis. Inner as used herein can refer to being radially closer to the axis while outer as used herein can refer to being radially further away from the axis.

The cap 11 is a retainer ring in the illustrated embodiment, but the cap 11 can be take various other shapes, such as that of a lid that fully covers opening 5. The cap 11 partially covers the opening 5 when mounted to the container body 2 in this embodiment. As shown, the cap 11 includes an annular retaining flange 27 which projects radially inward to engage an upper taper in the prepackaged beverage canister 10. Cap 11 includes inner threading which interfaces with complementary outer threading 13 of the mouth 12 of the container body 2. Rotating the cap 11 about the mouth 12 can either unsecure the cap 11 and the prepackaged beverage canister 10 or can secure the cap 11 to cause the annular retaining flange 27 to press down on the upper taper in prepackaged beverage canister 10 to secure prepackaged beverage canister 10 in the hold 7. While the cap 11 is threaded onto the mouth 12 in this embodiment, it may be press fit or connected by bayonet in other embodiments or a different retaining feature may be used in various other embodiments. As the cap 11 is threaded onto the mouth 12, the bottom side of the cap 11 may approach and possibly contact an annular ledge 14 of the container body 2.

In the illustrated embodiment, the mouth 12 is formed from multiple layers of metal. In particular, an inner layer is formed by an inner tubular sidewall 16 and an outer layer is formed by the outer tubular sidewall 15. Along the mouth 12, the inner tubular sidewall 16 is joined to the outer tubular sidewall 15 along joint 32. Joint 32 can be an airtight annular seal. In some embodiments, the inner tubular sidewall 16 and the outer tubular sidewall 15 are formed from the same piece of contiguous metal and joint 32 is not needed, and instead the piece of metal is bent to form the lip 6. Various other embodiments include lip 6 but not mouth 12.

In this embodiment, inner tubular sidewall 16 is formed by side sealing layer 17 and sleeve 18. The side sealing layer 17 is radially inward of the sleeve 18 (at least radially along the hold 7). The sleeve 18 comprises a sleeve sidewall 71 (which extends only vertically in this embodiment) and a sleeve floor 76 (which extends horizontally or radially in this embodiment). In this embodiment, the sleeve sidewall 71 is contiguous with the sleeve floor 76 such that both are formed from the same piece of material. The inner tubular sidewall 16 can include more layers. Between the side sealing layer 17 and the sleeve 18 is a sealed media chamber 70 and media 72, as further explained herein.

An inner bottom wall 23 defines a floor of the hold 7. The inner bottom wall 23 can be formed from metal, such as stainless steel or aluminum. In this embodiment, the inner bottom wall 23 is formed by a bottom sealing layer 25 and the sleeve 18. In this case, the part of the sleeve 18 that forms the inner bottom wall 23 is the sleeve floor 76. The inner bottom wall 23 can include more layers. Between the bottom sealing layer 25 and the sleeve 18 is the sealed media chamber 70 and the media 72, as further explained herein.

The outer tubular sidewall 15 extends from above the shoulder 19 to below the inner bottom wall 23. The outer tubular sidewall 15 may extend, in some embodiments, to the lip 6. The outer tubular sidewall 15 may extend below the inner bottom wall 23. The outer tubular sidewall 15 extends below the hold 7 to the outer bottom wall 24. In the illustrated embodiment, the outer tubular sidewall 15 extends below the hold 7 to the shoe 4.

The hold 7 is cylindrical. The hold 7 is defined by the inside surface of the inner tubular sidewall 16. This surface can directly contact the beverage and/or the prepackaged beverage container 10. This surface can be vertically straight such that the inner diameter of the hold 7 is constant, for a portion or the entirety, from the lip 6 to the inner bottom wall 23. This surface can be vertically slanted such that the inner diameter of the hold 7 widens or narrows along the axis between lip 6 and the inner bottom wall 23.

The container body 2 is generally formed by the inner tubular sidewall 16, the outer tubular sidewall 15, the inner bottom wall 23, and the outer bottom wall 24. Within and between the structures is formed a vacuum chamber 36. The vacuum chamber 36 is tubular around the hold 7 between the inner tubular sidewall 16 and the outer tubular sidewall 15. The vacuum chamber 36 further includes a planar section axially between the inner bottom wall 23 and the outer bottom wall 24. In another sense, the vacuum chamber 36 is formed radially between the inner tubular sidewall 16 and the outer tubular sidewall 15, and is formed axially between the inner bottom wall 23 and the outer bottom wall 24.

The outer bottom wall 24 can be connected to the outer tubular sidewall 15 by joint 34. Joint 34 can be an annular seam to create an airtight annular seal to maintain the vacuum chamber 36. To align the outer bottom wall 24 with the lower taper 35 of the outer tubular sidewall 15 to form joint 34, the outer bottom wall 24 may include an annular flange that is curved to transition from a planar portion that is orthogonal to the axis to a flange that is orientated parallel and coaxial with the axis. While the outer bottom wall 24 is shown attaching directly to the lower taper 35 of the outer tubular sidewall 15, the outer bottom wall 24 may instead attached to a non-tapered portion of the outer tubular sidewall 15 or may be indirectly connected to the outer tubular sidewall 15.

The inner tubular sidewall 16 can include an inner cylindrical portion 29. The outer tubular sidewall 15 can include an outer cylindrical portion 28. The inner cylindrical portion 29 can have a consistent radial thickness along its entire height. The outer cylindrical portion 28 can have a consistent radial thickness along its entire height. The outer cylindrical portion 28 can extend from the shoe 9 to the annular ledge 14, or in various other embodiments, to the mouth 12 or to the lip 6 (if no mouth 12 is present, as in subsequent embodiments). The inner cylindrical portion 29 can be parallel and coaxial with the outer cylindrical portion 29. The inner cylindrical portion 29 can extend from lower corner 20 to shoulder 19, with respectively represent transitions in radial thickness of the inner tubular sidewall 16.

In the illustrated embodiment, the inner tubular sidewall 16 includes a shoulder 19. The shoulder 19 is annular in that it extends entirely 360 degrees around the axis. The shoulder 19 defines a surface that is at least partially upwards facing within the vacuum chamber 36. In this case, the shoulder 19 is slanted relative to the radial and axial directions. The shoulder 19 represents a transition in the inner tubular sidewall 16 between a thinner neck 22 and a thicker trunk 21. The trunk 21 can be a major axial portion of the inner tubular sidewall 16 while the neck 22 can be a minor axial portion of the inner tubular sidewall 16 that is above the trunk 21. The neck 22 may be limited to extending from the shoulder 19 to the joint 32. The neck 22 may be limited to extending from the shoulder 19 to the lip 6. The height of the neck 22 may be between 0.125-1.5 inches, or more narrowly 0.25-0.5 inches in some embodiments. The neck 22 may be formed only by the inner tubular sidewall 16. The neck 22 is not be formed by the outer tubular sidewall 15. The radial inner surface of the neck 22 is exposed within the hold 7 while the radial outer surface of the neck is exposed within the vacuum chamber 36. More specifically in this embodiment, the side sealing layer 17 in various embodiments, as a single layer of metal, is exposed within the hold 7 and the vacuum chamber 36 along the neck 22. The trunk 21 may be at least 2.0 inches tall. The height of the trunk 21 may be between 3.0-7.0 inches, or more narrowly 4.5-6.0 inches. The trunk may be less than 8 inches tall.

In the illustrated embodiment, the inner tubular sidewall 16 includes a lower corner 20. The lower corner 20 can be on the bottom end 4 of the container body 2. The lower corner 20 is annular in that it extends entirely 360 degrees around the axis. The lower corner 20 represents a transition between the vertical sleeve sidewall 71 and the horizontal sleeve floor 76. The lower corner 20 transitions to downward facing surface 48. The downward facing surface 48 at least partially or entirely faces downward within the vacuum chamber 36, such as to the outer bottom wall 24. In this case, the lower corner 20 is slanted relative to the radial and axial directions. The lower corner 20 can represent a transition in radial thickness of the inner tubular sidewall 16, from thicker above the lower corner 20 and thinner or flat/non-existent below the lower corner 20 (e.g., along the downward facing surface 48). The top terminus of the inner cylindrical portion 29 can be defined by the shoulder 19. The bottom terminus of the inner cylindrical portion 29 can be defined by the lower corner 20 and/or downward facing surface 48.

The inner bottom wall 23 includes downward facing surface 48, which defines the lower terminus of the inner bottom wall 23 and faces downward into the vacuum chamber 36. The inner bottom wall 23 forms an upward facing surface 41. The upward facing surface 41 defines the lower boundary of the hold 7. The upward surface 41 may be bounded by the side sealing layer 17. The downward facing surface 48 is radially wider, and larger in surface area, as compared to the upward surface 41.

The inner bottom wall 23 forms a puck 26. The puck 26 can serve as part or all of a thermal reserve. The puck 26 is formed axially between the hold 7 and the vacuum chamber 36, and is entirely radially surrounded by the vacuum chamber 36. The puck 26 can be below the bottom sealing layer 25 and above the downward facing surface 48. The puck 26 can be in the shape of a disk. The puck 26 can have a round radial periphery as shown, however in other embodiments the periphery can be another shape. The puck 26 can be integrated with the inner bottom wall 23 and/or the inner tubular sidewall 16 as shown, or may be a separate component.

The inner tubular sidewall 16 can include an inner cylindrical portion 29. The inner cylindrical portion 29 can extend axially from the shoulder 19 to the lower corner 20. The inner cylindrical portion 29 can be a thermal reserve. An outer cylindrical portion 28 of the outer tubular sidewall 15 radially overlaps with the inner cylindrical portion 29.

The outer cylindrical portion 28 can extend above the inner cylindrical portion 29. The outer cylindrical portion 28 can extend below the inner cylindrical portion 29. As shown, the outer cylindrical portion 28 is axially longer than the inner cylindrical portion 29. More specifically, the annular ledge 14 (and the lip 6) is above the shoulder 19, respectively representing the tops of the outer cylindrical portion 28 and the inner cylindrical portion 29 respectively. The joint 34 is below the lower corner 20, respectively representing the bottoms of the outer cylindrical portion 28 and the inner cylindrical portion 29 respectively.

One or both of the shoulder 19 and the lower corner 20 can be a step, corresponding to a change in radial wall thickness of the inner tubular sidewall 16. Such a change in wall thickness can define the thicker trunk 21 and thinner neck 22. Such a change in wall thickness can define the inner cylindrical portion 29. Such a change in wall thickness can be an increase in thickness that projects radially outward into the vacuum chamber 36. Such a change in wall thickness may not project radially inward into the hold 7. There may be no corresponding step(s) in the outer tubular sidewall 15 that corresponds to the step(s) in the inner tubular sidewall 16. Any changes in inner wall surface profile within the hold 7 may correspond to profile changes in the inner diameter of the hold 7 (e.g., a narrowing or widening of a portion of the hold 7, decreasing or increasing, respectively, the diameter of the hold 7) but not changes in wall thickness.

The inner cylindrical portion 29 projects into the vacuum chamber 36 so that vacuum space of the vacuum chamber 36 is both directly axially above the inner cylindrical portion 29 and directly axially below the inner cylindrical portion 29. Such projection is due to a change in radial thickness of the inner tubular sidewall 16 and not a curve or step in the inner tubular sidewall 16 that does not change wall thickness. The inner cylindrical portion 29 includes a first exposed annular surface that is upwards facing within the vacuum chamber 36, as defined by the shoulder 19, and a second exposed annular surface that is downwards facing within the vacuum chamber 36, as defined by the lower corner 20 and/or downward facing surface 48.

In various embodiments, the shoe 9 does not seal the vacuum chamber 36. However, the shoe 6 provides mechanical support to the rest of the container body 2, and protects the outer bottom wall 24 which does seal the vacuum chamber 36. An annular interface between the shoe 9 and the outer tubular sidewall 15 is connected at joint 33.

The outer bottom wall 24 includes a port 30, which fluidly connects the vacuum chamber 36 to the atmosphere, or at least the area between the outer bottom wall 24 and the shoe 4, except for being sealed. In this embodiment, the port 30 is sealed by plug 31. The port 30 may be coaxial with the axis, or can be offset from the axis. The port 30 is formed in a dimple 39 of the outer bottom wall 24, the dimple 39 adding strength to the port 30 and protecting the plug 31.

To form the vacuum chamber 36, all gas, or most gas relative to the atmosphere, can be sucked through port 30 of dimple 39 from the vacuum chamber 36, such as when the entire container body 2 is placed under vacuum during the manufacturing process. To further help with gas evacuation, the container body 2 can be exposed to hear, such as above 300° F., which further helps expand and evacuate gas from the vacuum chamber 36. Plug 31 can fill the port 30 to prevent gas ingress after the vacuum chamber 36 has been evacuated. In some manufacturing techniques, plug 31 is a pellet of resin that is placed in the dimple 39 in the outer bottom wall 24 surrounding the port 30 while the container body 2 is placed upside down and exposed to heat of between 300-600° F. The pellet of resin can melt at its melting temperature to fill the port 30 and form plug 31. The plug 31 can then cool to permanently seal the port 30 to permanently maintain the vacuum chamber 36. Once the gas is removed and the vacuum chamber 36 is sealed, the vacuum chamber 36 can be a void. Various other methods are possible for developing and sealing the vacuum chamber 36.

It is worthwhile to briefly discuss thermal conduction. Thermal conduction is the flow of thermal energy through directly contacting materials. Such materials can be solids, liquids, or gasses. Thermal energy will only conduct along a thermal gradient, in which one material is at a higher temperature than the other, such that thermal energy only conducts from the higher temperature material to the lower temperature material. The rate of heat transfer is proportional to the degree of the gradient, with a greater rate of heat flow occurring across a greater heat gradient and a lesser rate of heat transfer occurring across a lower heat gradient. The flow of heat between directly contacting materials continues until they reach thermal equilibrium—the same temperature. Thermal energy does not conduct directly between materials that are not in direct contact or which are the same temperature (although heat may conduct indirectly through bridging material that is in direct contact). Moreover, because thermal energy only conducts along a gradient and the rate of heat transfer is proportional to the degree of the gradient, thermal energy will flow in greater quantity along a thicker piece of material than a thinner piece of material because a wider gradient front will be established along a wider piece of material than the narrower piece of material.

A vacuum chamber can create a gap to prevent thermal conduction. The vacuum chamber 36 surrounds the hold 7 radially, and axially on the bottom side. The vacuum chamber 36 insulates hold 7 by reducing or eliminating direct thermal conduction radially, and axially on the bottom surface 48 from the outer tubular sidewall 15 (except through lip 6 and/or mouth 12) and the outer bottom wall 24. The cylindrical gap of the vacuum chamber 36 between the inner tubular sidewall 16 and the outer tubular sidewall 15 prevents radial thermal conduction from the outer tubular sidewall 15, which can receive ambient thermal energy from the exterior surface 8, to the inner tubular sidewall 16, which contacts the beverage or the prepackaged beverage canister 10. The absence of gas within the cylindrical gap prevents conduction across the cylindrical gap between the inner tubular sidewall 16 and the outer tubular sidewall 15. Likewise, an axial gap of the vacuum chamber 36 between the inner bottom sidewall 23 and the outer bottom wall 24 (and/or the shoe 9), and the absence of gas within the axial gap, prevents conduction across the axial gap.

The inner tubular sidewall 16 and inner bottom wall 23 both hang within the vacuum chamber 36 from the neck 22. No supporting structure bridges across the vacuum chamber 36 to support the inner tubular sidewall 16 and inner bottom wall 23, except to the extent that the inner tubular sidewall 16 hangs on neck 22. In this embodiment, the inner bottom wall 23 is only in contact with the inner tubular sidewall 16 (except for the beverage and/or prepackaged beverage canister 10 in the hold 7). The inner tubular sidewall 16 is only in contact (indirectly or directly) with the outer tubular sidewall 15 at lip 5 and/or mouth 12.

To limit thermal convection, a coating may be applied to the surfaces within the vacuum chamber 36 to reflect electromagnetic radiation to minimize thermal radiation between the inner tubular sidewall 16 and the outer tubular sidewall 15, as well as between the inner bottom wall 23 and the outer bottom wall 24. The coating may create a reflective, low emittance surface. The coating may be on the outside of the inner tubular sidewall 16 and the inner bottom wall 23, and/or the inside of the outer tubular sidewall 15 and the outer bottom wall 24. Such coatings are typically thin and do not meaningfully contribute to weight, wall thickness, or heat capacity.

Due to the vacuum chamber 36, and possibly the coating, heat transfer may be limited to occurring (e.g., via conduction, convection and/or radiation) through the lip 6 and/or the mouth 12 where the inner tubular sidewall 16 comes in contact with the outer tubular sidewall 15. Limiting thermal conduction to the lip 6 and/or the mouth 12 substantially reduces thermal conduction to keep beverages at their desired temperature.

As further discussed herein, the illustrated embodiment takes particular advantage of the vacuum chamber 36 by forming a thermal reserve 37 within the vacuum chamber 36. As previously mentioned, conventional vacuum insulated container designs attempt to minimize and equalize wall thicknesses to save on weight, material cost, and thermal waste, or at least have the outer wall be thicker than the inner wall so that the outer wall is particularly robust.

Conventionally, a generic beverage container would be stored at ambient temperature (typically neither cooled or heated, such as between 60-80 degrees fahrenheit, often at or about 70 degrees fahrenheit) while the beverage (whether or not in a prepackaged beverage canister 10) would be cooled or heated as desired such as via a refrigerator, stove, kettle, or microwave oven while outside of the generic beverage container. Upon combining the cooled or heated beverage with the ambient temperature beverage container, the inner wall of the generic beverage container would unwantedly absorb heat from the heated beverage or transfer heat to the cooled beverage. This thermal waste is particularly pronounced with metal beverage containers due to the high heat capacity of metal. To minimize such thermal waste in generic metal vacuum insulated containers, the inner sidewall and bottom wall which contact either the beverage or the beverage container would be made as thin as possible. Various embodiments of this disclosure do the opposite by thickening the inner sidewall and/or bottom wall to create a vacuum insulated thermal reserve 37. This thermal reserve 37 can then be taken advantage of by the user cooling or heating the thermal reserve 37 before introduction of the beverage or beverage container into the hold 7 so that the thermal reserve 37 can cool or heat the beverage over time. The thermal reserve 37 shown in FIG. 4 is formed by the inner tubular sidewall 16 and the inner bottom wall 23, however various other thermal reserve designs are possible from one or both of an inner tubular sidewall or an inner bottom middle wall.

To use the thermal reserve 37, the user cools the container body 2, including the thermal reserve 37, during storage. For example, the container body 2 can be stored in a refrigerator or cooler along with the beverage (whereas conventional practice is to store a conventional vacuum insulated beverage container at ambient temperature while the beverage itself is stored in a cool environment). This can mean the container body 2 and the beverage can be within the cool environment together but separated, or the beverage can be placed within the hold 7 of the container body 2 so that they can be cooled or kept cool together. If cooled separately, the cooled beverage or prepackaged beverage canister 10 can be placed in the hold 7 after removal from the cool environment. If the beverage or prepackaged beverage canister 10 is the same temperature as the inner tubular sidewall 16, then there is no thermal gradient and the inner bottom wall 23 transfers no or little thermal energy to the beverage (they are at thermal equilibrium), thereby minimizing or eliminating thermal waste. Little or no thermal conduction takes place initially between the cooled beverage and the thermal reserve 37 because there is no thermal gradient due to thermal equilibrium. Alternatively, the container body 2 may be cooled to a lower temperature than the beverage so that, once combined, the thermal reserve 37 can absorb heat from the beverage to further cool the beverage. In some cases, the container body 2 may cooled below freezing temperature (e.g., placed in a freezer, or cooled to a temperature that is less than 32 degrees Fahrenheit, such as around zero degrees Fahrenheit) and then combined with an uncooled beverage (e.g., a beverage stored at ambient temperature), so that, once combined, the thermal reserve 37 can absorb heat from the beverage to cool the beverage to a desired temperature (e.g., around 37 degrees Fahrenheit as a common chilled temperature for a beverage). This manner of use can be particularly useful because then only the container body 2 needs to be stored in cool environment while various beverages can be stored at room temperature and only the chosen beverage is then cooled by the container body 2.

If the container body 2 was cooled before placing the beverage in the hold 7, then as the beverage warms due to thermal transfer through the opening 5 over time, the thermal reserve 37 can absorb the introduced heat from the beverage to minimize overall warming of the beverage. The thermal reserve 37 continues to cool the beverage even as heat is introduced over time through the opening 5. Due to the thermal reserve being within the vacuum chamber 36, other channels for heating the thermal reserve 37 are eliminated or minimized so that most or all of the thermal energy transferred to/from the thermal reserve 37 comes through the beverage itself, such that essentially all of the thermal transfer capacity of the thermal reserve 37 is used to stabilize the temperature of the beverage. For example, if the beverage warms very slowly due to minimal heat introduction to the beverage through the opening 5, then the thermal reserve 37 remains cool and ready to stabilize the temperature of the beverage because the thermal reserve 37 itself is insulated and it only uses its cooling capacity to the extent that the beverage warms, slowly in this case.

If a warm beverage is desired, then the user heats the thermal reserve 37, before introducing the beverage into the hold 7. To avoid risk of burning the user, the user only heats the thermal reserve 37, not the whole container body 2. This can be done by pouring a hot liquid into the hold 7 to warm the thermal reserve 37. The hot liquid can then be poured out before introducing the beverage or prepackaged beverage canister 10 into the hold 7. In this way, little or no heat is transferred from the beverage to the thermal reserve 37 soon after introduction and the beverage remains at or close to its original temperature. Over time, as the beverage cools due to thermal transfer through the opening 5, heat will be transferred from the thermal reserve 37 to the beverage to maintain the beverage close to its desired temperature. In an alternative manner of use, the container body 2 may not be preheated but the beverage is heated to be overly hot, above the desired consumption temperature before introduction into the hold 7. Upon introduction to the hold 7, the overly heated beverage transfers some of its thermal energy to the thermal reserve 37 until the beverage and the thermal reserve 37 reach thermal equilibrium, thus cooling the beverage to a desired consumption temperature. The thermal reserve 37 is thus heated by the beverage and then the thermal reserve 37 transfers thermal energy back over to the beverage as the beverage loses thermal energy over time through the opening 5.

The thermal reserve 37 can be formed by the container body 2 having a larger heat capacity radially and/or axially inward of the vacuum chamber 36 than outward of the vacuum chamber 36. Regarding the thermal reserve 37 being formed by the container body 2 having a larger heat capacity radially inward of the vacuum chamber 36 than outward of the vacuum chamber 36, the inner tubular sidewall 16 can have a larger heat capacity than the outer tubular sidewall 15. The heat capacity of the inner tubular sidewall 16 can be at least two, three, five, or ten times greater than the heat capacity of the outer tubular sidewall 15. To have a higher heat capacity, the inner tubular sidewall 16 can weigh at least two, three, five, or ten times more than the outer tubular sidewall 15. As examples, the inner tubular sidewall 16 can weigh more than the outer tubular sidewall 15. The inner tubular sidewall 16 can have a radial thickness greater than the radial thickness of the outer tubular sidewall 15. As examples, the inner tubular sidewall 16 can have a radial thickness at least two, three, five, or ten times thicker than the radial thickness of the outer tubular sidewall 15. The inner tubular sidewall 16 can have a radial thickness greater than the combined radial thickness of both of the vacuum chamber 36 and the outer tubular sidewall 15. As examples, the inner tubular sidewall 16 can have a radial thickness at least two, three, five, or ten times thicker than the combined radial thickness of both of the vacuum chamber 36 and the outer tubular sidewall 15.

The radial thickness of the outer tubular sidewall 15 may be made thin so as to minimize its heat capacity so that, if the whole container body 2 is cooled to cool the thermal reserve 37 (e.g., in a refrigerator), then the outer tubular sidewall 15 reaches ambient temperature rather quickly, due to the exterior surface 8 being exposed to ambient temperature, resulting in the container body 2 being more comfortable to hold in the user's hand as compared to a cold object while the thermal reserve 37 remains cold and ready to cool the beverage.

The thermal reserve 37 is located entirely radially and axially outside of the hold 7, and radially and axially inside of the vacuum chamber 36. The thermal reserve 37 is located entirely radially and axially between the hold 7 and the vacuum chamber 36.

The thermal reserve 37 can be formed by one or both of the inner tubular sidewall 16 and the inner bottom wall 23. The combined heat capacity of both of the inner tubular sidewall 16 and the inner bottom wall 23 is greater than the combined heat capacity of both of the outer tubular sidewall 15 and the outer bottom wall 24. The combined heat capacity of both of the inner tubular sidewall 16 and the inner bottom wall 23 can be at least double the combined heat capacity of both of the outer tubular sidewall 15 and the outer bottom wall 24. The combined heat capacity of both of the inner tubular sidewall 16 and the inner bottom wall 23 can be at least three times (or four times, in various embodiments) greater than the combined heat capacity of both of the outer tubular sidewall 15 and the outer bottom wall 24. In some embodiments, the heat capacity of the inner tubular sidewall 16 is greater than (or at least double or triple, in various embodiments) the combined heat capacity of both of the outer tubular sidewall 15 and the outer bottom wall 24. In some embodiments, the heat capacity of the inner bottom wall 23 is greater than (or at least double or triple, in various embodiments) the combined heat capacity of both of the outer tubular sidewall 15 and the outer bottom wall 24.

It is noted that it is particularly unconventional for the inner tubular sidewall 16 to have a higher heat capacity or weigh more than the outer tubular sidewall 15 because even if these components had equivalent wall thicknesses in a conventional design, then in the conventional design the outer tubular sidewall would have a larger circumference than the inner tubular sidewall due to the outer tubular sidewall being radially outward and thus the outer tubular sidewall would contain more material resulting in the outer tubular sidewall being heavier and having a higher heat capacity than the inner tubular sidewall.

The inner tubular sidewall 16 can have multiple radial thicknesses at different heights along the axis. The inner tubular sidewall 16 is radially thicker along the trunk 21 and radially thinner along the neck 22. The neck 22 being radially thinner than the trunk 21 can create a thermal bottleneck that slows heat transfer between the trunk 21 and the mouth 12 and/or lip 6 (if no mouth 12 is present, as in later embodiments), which helps keep the temperature of the trunk 21 isolated from atmospheric heat so its heat transfer is mainly with the beverage. The inner tubular sidewall 16 may range in radial wall thickness between 0.02-1.0 inches. The radial wall thickness of the side sealing layer 17 may be between 0.01-0.125 inches. The radial wall thickness of the sleeve 18 may be between 0.010.125 inches. The radial width between the side sealing layer 17 and the sleeve 18 may be between 0.2-1.0 inches. The radial thickness of the inner cylindrical portion 29 that forms the thermal reserve 37 may be between 0.22-1.0 inches. The outer tubular sidewall 15 can have multiple radial thicknesses at different heights along the axis. The outer tubular sidewall 15 may range in radial wall thickness between 0.01-0.125 inches. Other dimensional values are possible.

To form the thermal reserve 37 of the inner tubular sidewall 16 having higher heat capacity as compared to the outer tubular sidewall 15, the inner tubular sidewall 16 can include a protuberance that extends radially outward, into the vacuum chamber 36. The protuberance can extend entirely about the axis such that it is 360 degrees. The protuberance does not relate to a mere outward projecting bend in the inner tubular sidewall 16 in which the thickness of the inner tubular sidewall 16 does not change. Rather, the protuberance results from an increase in thickness of the inner tubular sidewall 16 projecting into the vacuum chamber 36.

The protuberance may be formed by the inner cylindrical portion 29. The protuberance may be formed by the trunk 21 extending radially relative to the neck 22. The protuberance can be formed by the shoulder 19 and/or lower corner 20, being that the shoulder 19 and lower corner 20 represent transitions in radial thickness of the inner tubular sidewall 16. In these ways, the protuberance protrudes into the vacuum chamber 36. As shown, the outer tubular sidewall 15 includes ledge 14 to wrap the vacuum chamber 36 around the protuberance between the ledge 14 and the exterior surface 8 to maximize the amount of material mass of the inner tubular sidewall 15 that is insulated by the vacuum chamber 36. The vacuum chamber 36 can be positioned directly axially above and below the protuberance. The greater heat capacity, weight, and/or radial thickness of the protuberance relative to the rest of the inner tubular sidewall 16 may mean that functionally, most or all of the thermal reserve 37 is provided by the protuberance relative to the rest of the inner tubular sidewall 16.

The inner cylindrical portion 29 can have a larger heat capacity than the outer cylindrical portion 28. The heat capacity of the inner cylindrical portion 29 can be at least two, three, five, or ten times greater than the heat capacity of the outer tubular sidewall 15. To have a higher heat capacity, the inner cylindrical portion 29 can weigh at least two, three, five, or ten times more than the outer cylindrical portion 28. As examples, the inner cylindrical portion 29 can weigh more than the outer cylindrical portion 28. The inner cylindrical portion 29 can have a radial thickness greater than the radial thickness of the outer cylindrical portion 28.

As examples, the inner cylindrical portion 29 can have a radial thickness at least two, three, five, or ten times thicker than the radial thickness of the outer cylindrical portion 28. The inner cylindrical portion 29 can have a radial thickness greater than the combined radial thickness of both of the vacuum chamber 36 and the outer cylindrical portion 28. As examples, the inner cylindrical portion 29 can have a radial thickness at least two, three, five, or ten times thicker than the combined radial thickness of both of the vacuum chamber 36 and the outer cylindrical portion 28.

The radial width of shoulder 19 and/or the lower corner 20, corresponding to the radial thickness of the protuberance of the thermal reserve 37 into the vacuum chamber 36, can be in the range of 0.2-1.5 inches. Other ranges are possible. The height of the inner cylindrical portion 29, can be the axial distance from shoulder 19 to the lower corner 20. Such height can be between 2.0-8.0 inches, although different ranges are possible.

The height of the hold 7 is from the upward facing surface 41 of the inner bottom wall 23 to the opening 5 (e.g., the circular plane formed by the lip 6). The inner cylindrical portion 29 may extend axially along the hold 7 for at least a third of the height of the hold 7. In some embodiments, the inner cylindrical portion 29 extends axially along the hold 7 for at least a half of the height of the hold 7. In some embodiments, the inner cylindrical portion 29 extends axially along the hold 7 for at least two thirds of the height of the hold 7. As shown, the inner cylindrical portion 29 does not extend axially along the hold 7 for the full height of the hold 7. In some embodiments, the inner cylindrical portion 29 does not extend axially along the hold 7 for any more than nine tenths of the full height of the hold 7. In some embodiments, the inner cylindrical portion 29 does not extend axially along the hold 7 for any more than three fourths of the full height of the hold 7. In some embodiments, the inner cylindrical portion 29 does not extend axially along the hold 7 for any more than two thirds of the full height of the hold 7.

Regarding the thermal reserve 37 being formed by the container body 2 having a larger heat capacity axially inward of the vacuum chamber 36 than axially outward of the vacuum chamber 36, the inner bottom wall 23 can have a larger heat capacity then the outer bottom wall 24. The heat capacity of the inner bottom wall 23 can be at least two, three, five, or ten times greater than the heat capacity of the outer bottom wall 24. To have a higher heat capacity, the inner bottom wall 23 can weigh at least two, three, five, or ten times more than the outer bottom wall 24. As examples, the inner bottom wall 23 can have an axial thickness at least two, three, five, or ten times thicker than the axial thickness of the outer bottom wall 24.

It is noted that it is particularly unconventional for the inner bottom wall 23 to have a higher heat capacity or weigh more than the outer bottom wall 24 because even if these components had equivalent wall thicknesses in a conventional design, then the outer bottom wall would weigh more, and have a higher heat capacity than the inner bottom wall due to the outer bottom wall necessarily having a larger diameter than the inner bottom wall, and further because the outer bottom wall includes bends such as dimple 39 and alignment for joint 34.

As shown, the distance of the radial gap between the outer tubular sidewall 16 and inner tubular sidewall 15 that defines the vacuum chamber 36 may be different at different heights along the axis. As such, the vacuum chamber 36 may have a first radial gap distance at a first axial location and a second radial gap distance at a second axial location, the first radial gap distance different than the second radial gap distance.

The thermal reserve 37 is suspended within the vacuum chamber 36. All of the weight of the thermal reserve 37 is supported through the neck 22. All of the weight of the thermal reserve 37 is supported through one or both of the mouth 12 and the lip 6 (which may exclusively be the lip 6 in embodiments that do not include a mouth 12). All of the weight of the thermal reserve 37 is supported through joint 32 that connects the inner tubular sidewall 16 to the outer tubular sidewall 15. All weight of the inner tubular sidewall 16 and inner bottom wall 123 (including all weight within the hold 7 and the thermal reserve 7) is supported through the outer tubular sidewall 15. Furthermore, all weight of the beverage container 1 is supported by shoe 9.

In various embodiments, the inner tubular sidewall 16 is a single layer (e.g., solid metal) radially from the hold 7 to the vacuum chamber 36. Likewise, the inner bottom wall 23 may be a single layer (e.g., solid metal) axially from the hold 7 to the vacuum chamber 36. However, in the illustrated embodiment of FIG. 4, the thermal reserve 37 of the inner tubular sidewall 16 is formed by multiple layers. In the embodiment shown in FIG. 4, the inner tubular sidewall 16 comprises a side sealing layer 17 and a sleeve 18. The sleeve 18 is positioned radially outward from the side sealing layer 17. In the illustrated embodiment, the side sealing layer 17 extends axially above the sleeve 18. In the illustrated embodiment, the sleeve 17 extends below the side sealing layer 17. Along the hold 7, and extending below the hold 7, the sleeve 18 includes a sleeve sidewall 71. Both of the side sealing layer 17 and the sleeve sidewall 71 are coaxial or substantially coaxial with the axis. The sleeve sidewall 71 is radially outward of, and overlapping at least part of, the side sealing layer 17.

The inner bottom wall 23, in this embodiment, is multi-layered and includes a bottom sealing layer 25 and the sleeve 18. More specifically, a sleeve floor 76 of the sleeve 18 defines a bottom of the inner bottom wall 23 (e.g., the boundary layer with the vacuum chamber 36). Both of the bottom sealing layer 25 and the sleeve floor 76 are orientated orthogonal or substantially orthogonal with respect to the axis. The bottom sealing layer 25 is located above the sleeve floor 76 along the axis. In this embodiment, the side sealing layer 17 is directly connected to the bottom sealing layer 25, which may be the same contiguous piece of metal or may be formed separately and then joined.

An inner cup 40 is formed by the side sealing layer 17 being connected to the bottom sealing layer 25. The inner cup 40 directly holds the beverage or holds the disposable container that contains the beverage.

An outer cup 80 is formed by the sleeve sidewall 71 being directly connected to the sleeve floor 76, which may be the same contiguous piece of metal or may be formed separately and then joined. The outer cup 80 does not directly hold the beverage or similar disposable beverage container. The inner cup 40 is partially contained within the outer cup 80. The outer cup 80 extends below the inner cup 40 and the inner cup 40 extends above the outer cup 80. The outer cup 80 is radially wider than the inner cup 40. In this embodiment, the outer cup 80 narrows at shoulder 19 to form joint 43 with the exterior of the inner cup 40. The joint 43 may be an annular weld. The outer cup 80 is attached to the inner cup 40. The outer cup 80 may only contact the inner cup 40 at the joint 43, which is above the shoulder 19. The outer cup 80 hangs from the inner cup 40. The outer cup 80 may only be supported by the inner cup 40.

Between the inner cup 40 and the outer cup 80 is a sealed media chamber 70. The sealed media chamber 70 is formed by the inner cup 40 and the outer cup 80. In this embodiment, the sealed media chamber 70 is formed only by the inner cup 40 and the outer cup 80. The sealed media chamber 70 is radially between the side sealing layer 17 and the sleeve sidewall 71. The sealed media chamber 70 is axially between the bottom sealing layer 25 and the sleeve floor 76. The sealed media chamber 70 itself forms a cup shape, having cylindrical walls and a floor. The sealed media chamber 70 can be sealed by the shoulder 19 tapering the radius of the sleeve 18 to contact the side sealing layer 17 and/or otherwise make joint 43. Joint 43 is an annular, sealed connection. The sleeve 18 is not relied upon to seal the vacuum chamber 36 from atmosphere. Rather, the sleeve 18 seals the media 72 within the sealed media chamber 70 from the vacuum chamber 36, thereby maintaining the vacuum chamber 36 but not from atmosphere. Likewise, joint 43 maintains the vacuum chamber 36 from the media 72, but not from atmosphere.

The sealed media chamber 70 comprises a radial part that is located directly radially between the hold 7 and the vacuum chamber 36, and an axial part that is located directly axially between the hold 7 and the vacuum chamber 36.

The sealed media chamber 70 is filled with media 72. Media 72 can be a liquid and/or a gel. The media 72 may be non-structure (unlike a wall or a floor). The sealed media chamber 70, as well as the media 72 therein, surrounds the inner cup 40. More specifically, the sealed media chamber 70, and the media 72, are entirely radially around (360 degrees) the inner cup 40 for a portion of the height of the inner cup 40. Sealed media chamber 70 and the media 72 are axially directly below the inner cup 40. Joint 43 (and corner 20 if it represents a junction of two pieces) creates a fluid tight seal that keeps the media 72 within the sealed media chamber 70 so that it does not infiltrate the vacuum chamber 36.

The sealed media chamber 70, as well as the media 72 therein, surrounds the inner cup 40. More specifically, the sealed media chamber 70, and the media 72, are entirely radially around the inner cup 40. Sealed media chamber 70 and the media 72 are axially directly below the inner cup 40. The vacuum chamber 36 extends from above the sealed media chamber 70 and the media 72 to below the sealed media chamber 70 and the media 72 while be radially entirely around the sealed media chamber 70 and the media 72. More specifically, the vacuum chamber 36 is directly axially above the sealed media chamber 70 and the media 72 and directly axially below the sealed media chamber 70 and the media 72.

As shown, the sleeve sidewall 71 is axially longer than the side sealing layer 17, so that the sealed media chamber 70 (and outer cup 80) is taller, and more specifically deeper, relative to the inner cup 40. The sealed media chamber 70 hangs from, and below, the inner cup 40. The sealed media chamber 70 (and outer cup 80) is wider than the inner cup 40.

The volume of the outer cup 80 (minus the volume of the inner cup 40) may be at least 25% of the volume of the inner cup 40. The volume of the outer cup 80 (minus the volume of the inner cup 40) may be at least 50% of the volume of the inner cup 40.

The vacuum chamber 36 can entirely insulate the sealed media chamber 70 from conduction loss except for loss through the inner cup 40 (e.g., via the opening 5) or along the neck 22. The vacuum chamber 36 extends radially around the sealed media chamber 70. The vacuum chamber 36 extends axially directly above and below the sealed media chamber 70 to further isolate the sealed media chamber 70 as a thermal reserve 37.

The thermal reserve 37 can be formed by the media 72 within the sealed media chamber 70. The thermal reserve 37 can thermally stabilize the temperature of the beverage by sinking heat from the beverage to counteract ambient heating of a cold beverage or transferring heat to a warm beverage to counteract heat loss of the warm beverage. The media 72 can yield higher heat sinking performance as compared to the thermal reserve 37 being solid metal due to the media 72 having higher capacity than solid metal. For example, water has one of the highest heat capacities of all stable liquids, and significantly higher than that of essentially all metals, by weight. Accordingly, the media 72 can contain water. In various embodiments, the media 72 includes food grade antifreeze agent with water, such as propylene glycol, to lower the freezing point of the media 72 to allow the media 72 to be brought below what would freeze water to provide a thermal sink with even more capacity. The addition of propylene glycol or other anti-freeze agent with water can also raise the boiling point of the water, to allow the thermal reserve to be heated as previously described without boiling. The ratio of water to propylene glycol or other antifreeze agent may be 50:50 or similar mixture, which at 50:50 would provide protection from freezing down to about −30 degrees Fahrenheit and protection from boiling to about 210 degrees Fahrenheit, allowing the media 72 to be well below freezing or near boiling temperature to provide substantial cooling or heating to the beverage. If in the form of a gel, then a liquid can be prepared containing water and an anti-freeze agent such as propylene glycol, and further mixed with hydroxyethyl cellulose, sodium polyacrylate, or vinyl-coated silica, amongst other options gelling options to the liquid solution.

During manufacture, the mass and heat capacity of the thermal reserve may prevent boiling of the media 72 long enough to allow the plug 31 to melt and seal the port 30. This is despite the plug 31 melting at a temperature higher than the boiling temperature of the media 72, being that the mass of the plug 31 is substantially smaller than the mass of the media 72, and the plug 31 being located axially away from the media 72.

In the illustrated embodiment, the sleeve 18 is not relied upon to seal the vacuum chamber 36 from the atmosphere. Rather, the sleeve 18 seals the media 72 within the sealed media chamber 70 from the vacuum chamber 36. The sleeve sidewall 71 separates and seals both of the vacuum chamber 36 and the media chamber 70. The side sealing layer 17 separates and seals both of the media chamber 70 and the vacuum chamber 36, relative to the hold 7.

Starting from the axis (e.g., at a middle point along the axis) and extending radially outward orthogonal to the axis, the container body 2 includes, in order, a hold 7, a side sealing layer 17, sealed media chamber 72 containing media 72, sleeve sidewall 71, vacuum chamber 36, and outer tubular sidewall 15. Starting from the axis (e.g., at a middle point along the axis) and extending radially outward orthogonal to the axis, the container body 2 includes, in order, hold 7, inner cup 40, sealed media chamber 72 containing media 72, outer cup 80, vacuum chamber 36, and outer tubular sidewall 15. Along the axis (e.g., at a middle point along the axis) and extending downward along the axis, the container body 2 includes, in order, hold 7, bottom sealing layer 25, sealed media chamber 72 containing media 72, sleeve floor 76, vacuum chamber 36, and outer bottom wall 24 (which may include port 30 and plug 31 although these components may not be aligned with the axis), and a shoe 4 (although the shoe 4 may be optional). Along the axis (e.g., at a middle point along the axis) and extending downward along the axis, the container body 2 includes, in order, hold 7, inner cup 40, sealed media chamber 72 containing media 72, outer cup 80, vacuum chamber 36, and outer bottom wall 24 (which may include port 30 and plug 31 although these components may not be aligned with the axis), and in some embodiments a shoe 4 although the shoe 4 may be optional. Various coatings, such as paint and/or radiant heat reflective coatings amongst others, may be provided on the various surfaces.

It is noted that the embodiments presented herein can cool or heat a beverage, and/or stabilize the temperature of the beverage, without ice packs, ice, or cold and/or hot parts being inserted into the container body 2, into the hold 7, or radially inward of the side sealing layer 17 (except the beverage and prepackaged beverage canister 10). Such inserts would mean multiple parts that risk being lost, assembled incorrectly by the user, and provides extra surfaces and crevices and gaps that need to be washed or otherwise could harbor beverage remnants. Furthermore, no non-consumable heating or cooling elements (sealed ice or gel packs, stones for heating or cooling, electric heating or cooling elements, or other artificial materials) are placed into the hold 7 (i.e. directly radially inward of the side sealing layer 17) to heat, cool, or otherwise stabilize the temperature of the beverage within the hold 7, except the beverage itself. The container body 2 may have multiple components but, in various embodiments, all components are permanently fixed with respect to each other so that the container body 2 is a discrete single piece, and that in use, no part of the container body 2 is removed or added, including the part(s) that form the thermal reserve 37. The ability to cool a beverage without added ice means that the beverage is not watered down.

The groove 50 bulges inward to be directly above the inner cylindrical portion 29 (and the sealed media chamber 70). The groove 50 bulging in this location takes advantage of the neck 22 being radially thinner than the trunk 21, such that the groove 50 radially overlaps with the neck 22. In this embodiment, the groove 50 also radially overlaps with the shoulder 19. The groove 50 indents into the vacuum chamber 36. The groove 50 is annular about the entirety of the cylindrical body 2. The groove 50 serves as a grip into which one or more fingers can extend into to enhance the user's grip on the beverage container 1. The groove 50 is located above the center of mass of the beverage container 1, and in particular above the trunk 21 and puck 26, so that the majority of the weight of the beverage container 1 hangs below this groove 50. In this way, moving the beverage container 1 in the user's hand is less likely to spill due to the hanging weight being self-stabilizing, as compared to holding a weight below its center of mass.

Figures 5, 6:
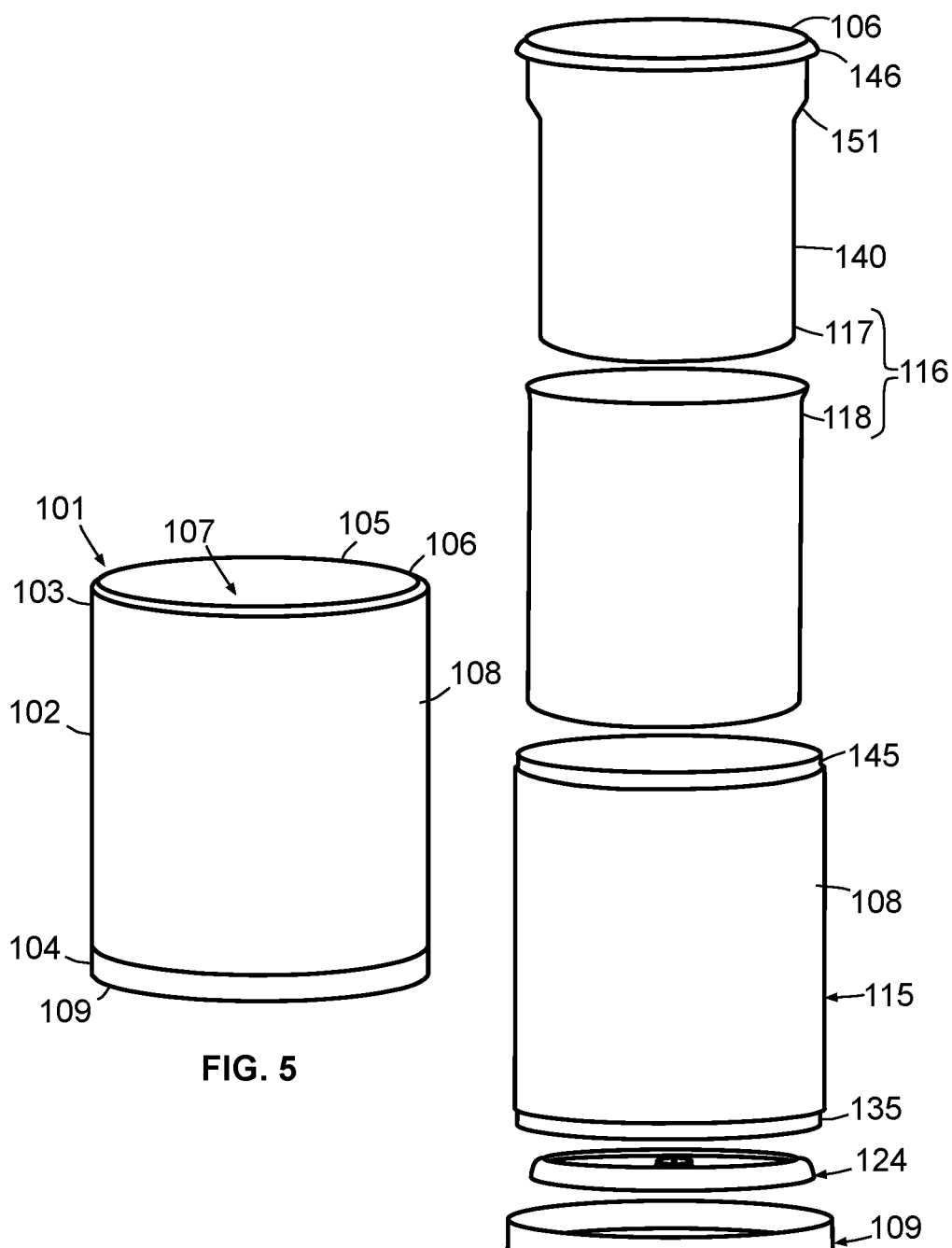
FIG. 5 shows a perspective view for a beverage container in a tumbler design.
FIG. 6 shows an exploded view of the beverage container of FIG. 5.
Figure 7:
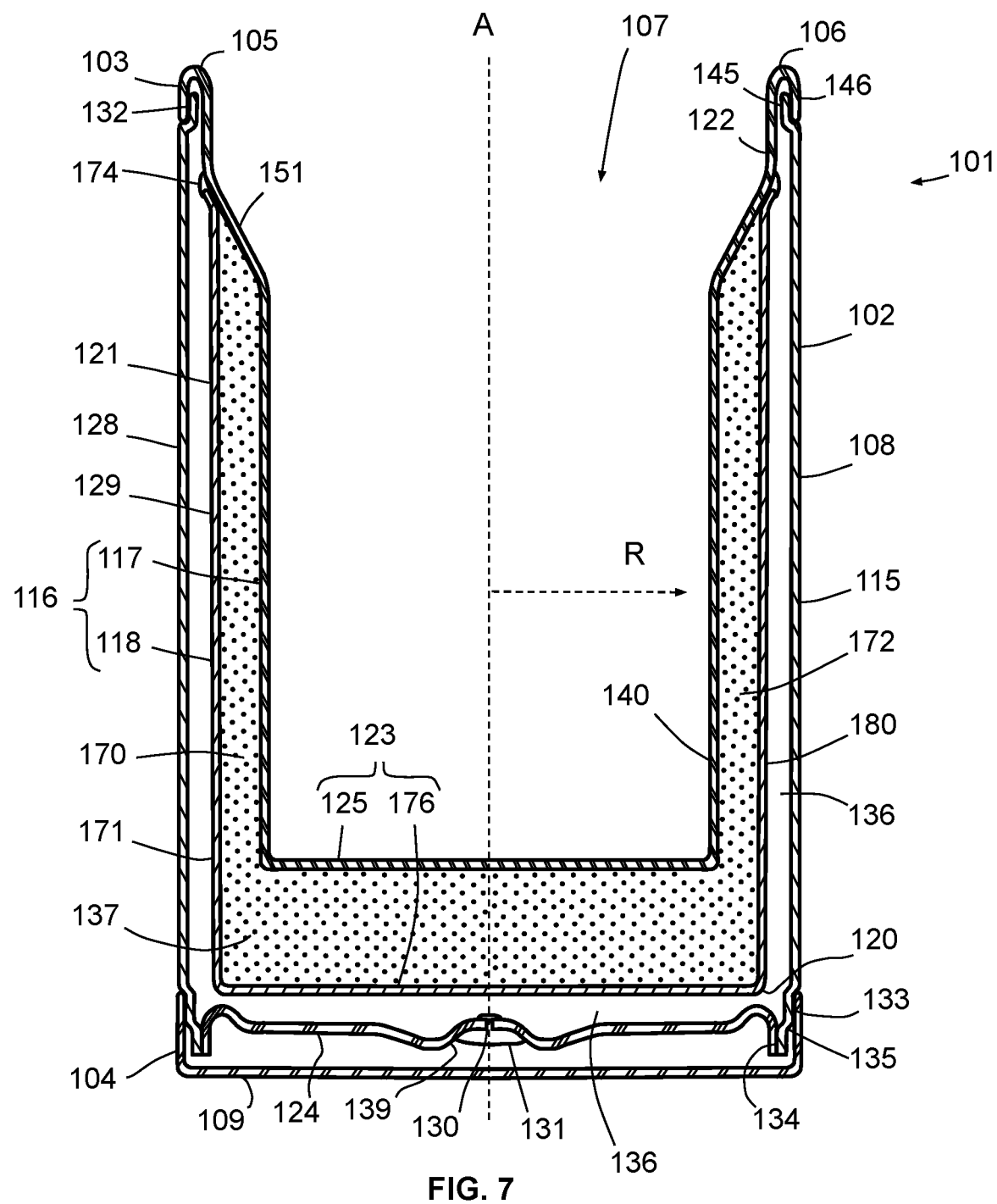
FIG. 7 shows a cross-sectional view of the beverage container of FIGS. 5-6.

FIGS. 5-7 show a different embodiment of a beverage container having a thermal reserve as compared to the embodiment of FIGS. 1-4. Details of the second embodiment that are redundant with the first embodiment will not be repeated, with the understanding that the details of the above discussion apply to the second embodiment. For example, shapes, materials, properties, functions, relationships, etc. of parts with common reference numbers (e.g., 2 and 102, or 18 and 118) are assumed to be the same (or at least applicable) between embodiments unless specifically stated or shown to be incompatible, and are not repeated for brevity. Likewise, options and alternative feature described in relation to the first embodiment should be understood as also being applicable to this second embodiment.

FIG. 5 shows a perspective view of a beverage container 101. The beverage container 101 includes a container body 102. The container body 102 includes a top end 103, a bottom end 104, and an exterior surface 108. The bottom end 104 includes a shoe 109. An annular lip 106 is located at the top of the container body 102. The beverage container 101 includes an opening 105, in this case defined by the annular lip 106, to a hold 107.

FIG. 6 shows an exploded view (not done during working life) and FIG. 6 shows a cross sectional view of the beverage container 101 of FIG. 5.

The container body 102 includes an outer tubular sidewall 115 which defines the exterior surface 108. The outer tubular sidewall 115 includes a lower taper 135 to fit into the shoe 109. The container body 102 includes an inner tubular sidewall 116. The inner tubular sidewall 116 defines the hold 107. The inner tubular sidewall 116 includes a side sealing layer 117, which can be the radially innermost layer of the inner tubular sidewall 116 which defines the hold 7 and directly contacts the beverage, and a sleeve 118. The inner surface defining the hold 107 can be vertically straight such that the inner diameter of the hold 107 is constant, for a portion or the entirety, from a taper 151 to an inner bottom wall 123. The outer bottom wall 124 can be connected to the outer tubular sidewall 115 by joint 134.

The container body 102 is formed by the inner tubular sidewall 116 and the outer tubular sidewall 115 forming a vacuum chamber 136 radially there between, the inner bottom wall 123 and the outer bottom wall 124 further forming the vacuum chamber 136 axially there between.

The material that forms the inner tubular sidewall 116 bends to form lip 106 and bends further to form overhang 146. An upper taper 145 in the outer tubular sidewall 115 fits within the overhang 146 to form joint 132. Joint 132 is annular and can seal the vacuum chamber 136 from atmosphere. In an alternative embodiment, the material that forms the outer tubular sidewall 115 bends to form lip 106 (instead of the inner tubular sidewall 116) and bends further to form overhang 146 on the inside of the hold 7.

The taper 151 is formed in the inner tubular sidewall 116, on the top end 103 of the container body 102. The taper 151 defines a change in thickness of the inner tubular sidewall 116, which is thinner above the taper 151 to form neck 122 and thicker below the taper 151 to form trunk 121. In this embodiment, the taper 151 also corresponds with a change in diameter of the hold 107 axially along the taper 151. In this case, the hold 107 widens in the upward direction along the taper 151. Due to the taper 151, part of the hold 107 is directly axially above the inner cylindrical portion 129 and the trunk 121. The neck 122 can extend from the taper 151 to the lip 106. The neck 122 can extend from the joint 174 to the opening 105.

The vacuum space of the vacuum chamber 136 is both above the inner cylindrical portion 129 and directly axially below the inner cylindrical portion 129.

A plug 131 within a port 130 of the outer bottom wall 124 can seal the vacuum chamber 136 during manufacturing, as previously described. The port 130 may be in dimple 139 of the outer bottom wall 124. A joint 133 is formed as an annular interface between the shoe 109 and the outer tubular sidewall 115 where the lower taper 135 inserts into shoe 109.

In this embodiment, the inner tubular sidewall 116 is formed from multiple layers. Such layers include a side sealing layer 117 and a sleeve 118. The inner tubular sidewall 116 is attached to an inner bottom wall 123 that defines the floor of the hold 107. More particularly, the side sealing layer 117 is attached the bottom sealing layer 125. The hold 107 is sealed for holding the beverage by the side sealing layer 117 and the bottom sealing layer 125 to form inner cup 140. The inner cup 140 holds the beverage by directly contacting the beverage.

The sleeve 118 in this embodiment includes a sleeve sidewall 171 and a sleeve floor 176. The sleeve sidewall 171 is attached to the side sealing layer 117 at joint 174. The joint 174 is an annular seal and connects the top of the outer cup 180 to the inner cup 140, or more particularly the top of the sleeve sidewall 171 to the side sealing layer 117. The joint 174 is below the neck 122. The neck 122 can extend upwards from the joint 174 to the lip 106. An inner cylindrical portion 129 can be defined as extending from one or both of the joint 174 and the taper 151, on its upper end, to corner 120 on its lower end. The outer tubular sidewall 115 can define an outer cylindrical portion 128. The inner cylindrical portion 129 and outer cylindrical portion 128 can have the relationships described in connection with other embodiments.

The inner bottom wall 123 is multilayered in this embodiment. The layers of the inner bottom wall 123 includes a bottom sealing layer 125 and the sleeve floor 176.

The sleeve sidewall 171 is directly connected to the sleeve floor 176 to form outer cup 180. Between the inner cup 140 and the outer cup 180 is formed sealed media chamber 170. The sealed media chamber 170 contains media 172. The media 172 can be as described elsewhere herein and serves as a thermal reserve 137 which can function as described elsewhere herein to stabilize the temperature of a beverage within the hold 107.

It is noted that part of the hold 107 is directly axially above the sealed media chamber 170 (and the media 172) due to the taper 151. Also, the sealed media chamber 170 and the media 172 are directly below the side sealing layer 117 and the inner cup 140.

The inner tubular sidewall 116 and inner bottom wall 123, including the thermal reserve 137, both hang within the vacuum chamber 136 from the neck 122. No supporting structure bridges across the vacuum chamber 136 to support the inner tubular sidewall 116, the inner bottom wall 123, and the thermal reserve 137, except to the extent that the inner tubular sidewall 116 hangs on neck 122. In this embodiment, the inner bottom wall 123 is only in contact with the inner tubular sidewall 116 (except for the beverage and/or prepackaged beverage canister in the hold 107). The inner tubular sidewall 116 is only in contact (indirectly or directly) with the outer tubular sidewall 115 at joint 132.

Figure 8:
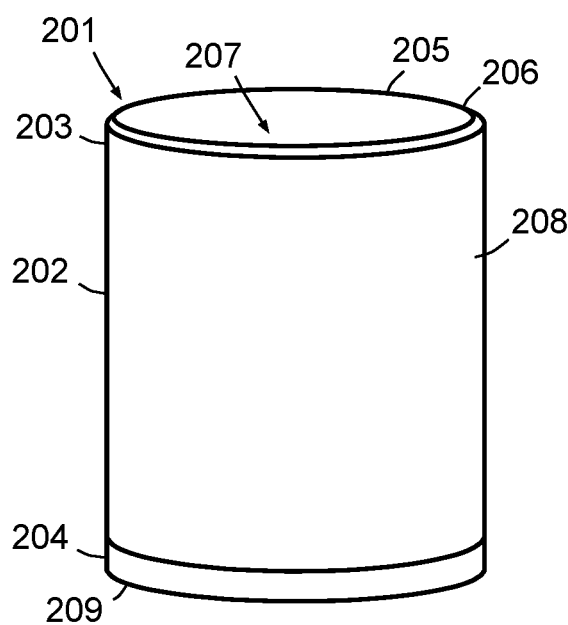
FIG. 8 shows a perspective view for a beverage container in a tumbler design.
Figure 9:
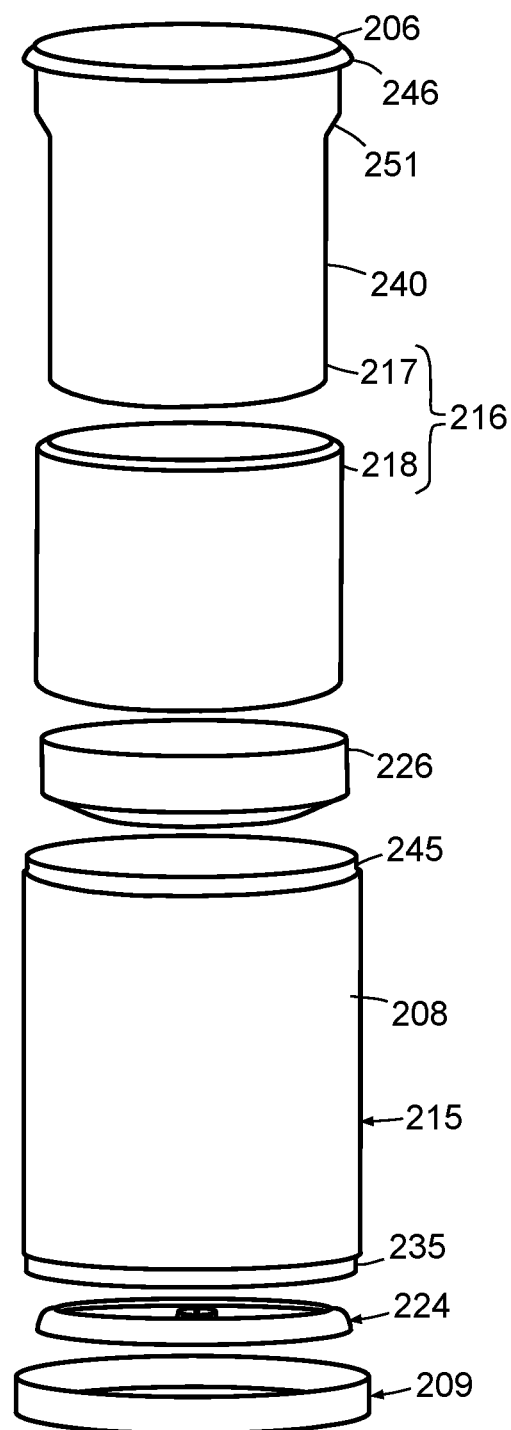
FIG. 9 shows an exploded view of the beverage container of FIG. 8.
Figure 10:
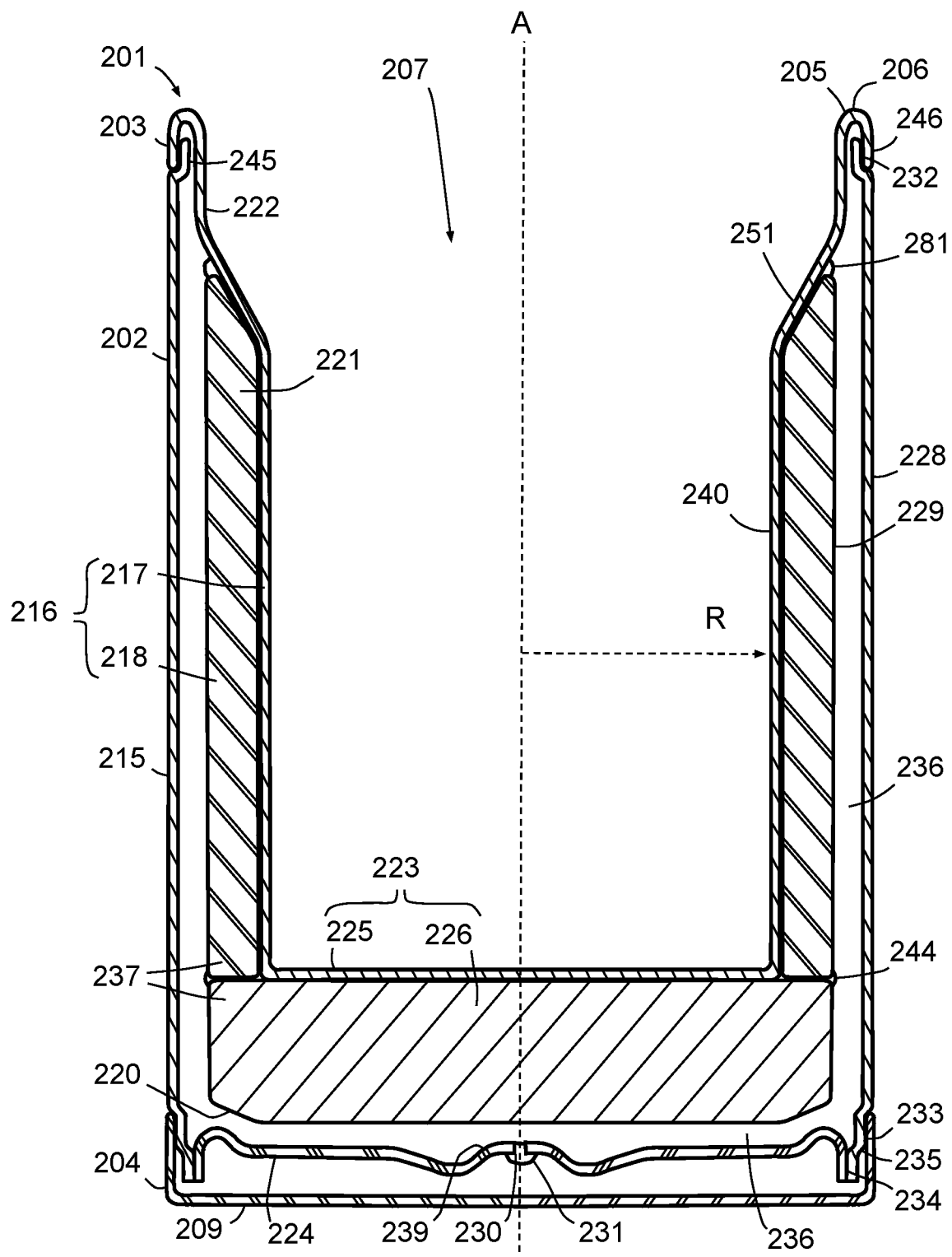
FIG. 10 shows a cross-sectional view of the beverage container of FIGS. 8-9.

FIGS. 8-10 show a different embodiment of a beverage container having a thermal reserve as compared to the previous embodiments. Details of this third embodiment that are redundant with the one or both of the previous embodiments may not be repeated, with the understanding that the details of the above discussion apply to the third embodiment. For example, shapes, materials, properties, functions, relationships, etc. of parts with common reference numbers (e.g., 2, 102, 202, or 28, 118, 218) are assumed to be the same (or at least applicable) between embodiments unless specifically stated or shown to be incompatible, and are not repeated for brevity. Likewise, options and alternative feature described in relation to the first and/or second embodiments should be understood as also being applicable to this third embodiment.

FIG. 8 shows a perspective view of a beverage container 201. The beverage container 201 includes a container body 202. The container body 202 includes a top end 203, a bottom end 204, and an exterior surface 208. The bottom end 204 includes a shoe 209. An annular lip 206 is located at the top of the container body 202. The beverage container 201 includes an opening 205 into a hold 207.

FIG. 9 shows an exploded view (not done during working life) and FIG. 10 shows a cross sectional view of the beverage container 201 of FIG. 8.

The container body 202 includes an outer tubular sidewall 215 which defines the exterior surface 208. The outer tubular sidewall 215 includes a lower taper 235 to fit into the shoe 209. The container body 202 includes an inner tubular sidewall 216. The inner tubular sidewall 216 defines part of the hold 207. The inner tubular sidewall 216 includes a side sealing layer 217, which can be the radially innermost layer of the inner tubular sidewall 216 which directly contacts the beverage, and a sleeve 218 radially outward of the side sealing layer 217. The outer bottom wall 224 can be connected to the outer tubular sidewall 215 by joint 234.

The container body 202 is generally formed by the inner tubular sidewall 216 and the outer tubular sidewall 215 forming a vacuum chamber 236 radially there between, and the inner bottom wall 223 and the outer bottom wall 224 further forming the vacuum chamber 236 axially there between.

The material that forms the inner tubular sidewall 216 bends to form lip 206 and bends further to form overhang 246. An upper taper 245 in the outer tubular sidewall 215 fits within the overhang 246 to form joint 232. Joint 232 is annular and can seal the vacuum chamber 236 from atmosphere. In an alternative embodiment, the material that forms the outer tubular sidewall 215 bends to form lip 206 (instead of the inner tubular sidewall 216) and bends further to form overhang 246 on the inside of the hold 7.

The taper 251 is formed in the inner tubular sidewall 216, on the top end 203 of the container body 202. The taper 251 defines a change in thickness of the inner tubular sidewall 216, which is thinner above the taper 251 to form neck 222 and thicker below the taper 251 to form trunk 221. In this embodiment, the taper 251 also corresponds with a change in diameter of the hold 207 axially along the taper 251. In this case, the hold 207 widens in the upward direction along the taper 251. Due to the taper 251, part of the hold 207 is directly axially above the inner cylindrical portion 229, the sleeve 218, and the trunk 221. The neck 222 extends from the taper 251 to the lip 206. The neck 222 can extend from the joint 218 to the opening 205. The vacuum space of the vacuum chamber 236 is both above the inner cylindrical portion 229 and directly axially below the inner cylindrical portion 229.

A plug 231 within a port 230 of the outer bottom wall 224 can seal the vacuum chamber 236 during manufacturing, as previously described. The port 230 may be in dimple 239 of outer bottom wall 224. A joint 233 is formed as annular interface between the shoe 209 and the outer tubular sidewall 215 where the lower taper 235 inserts into shoe 209.

In this embodiment, the inner tubular sidewall 216 is formed from multiple layers. Such layers include a side sealing layer 217 and a sleeve 218. The inner tubular sidewall 216 is attached to an inner bottom wall 223 that defines the floor of the hold 207. More particularly, the side sealing layer 217 is attached the bottom sealing layer 225. The hold 207 is sealed by the side sealing layer 217 and the bottom sealing layer 225 to form inner cup 240. The inner cup 240 holds the beverage by directly contacting the beverage.

The sleeve 218 in this embodiment does not include a floor. The sleeve 218 is attached to the side sealing layer 217 at joint 281. The joint 281 bonds the top of the sleeve 218 to the side sealing layer 217, in either a continuous bond or spot bond annularly. Joint 281 can be, for example, welding. The joint 281 can be below the neck 222. In this way, the neck 222 can defined as extending upwards from the joint 281 to the lip 206. An inner cylindrical portion 229 can be defined as extending from one or both of the joint 281 and the taper 251, on its upper end, to corner 220 on its lower end. The outer tubular sidewall 215 can define an outer cylindrical portion 228. The inner cylindrical portion 229 and outer cylindrical portion 228 can have the relationships described in connection with other embodiments.

In this embodiment, the sleeve 218 does not extend below the bottom sealing layer 225. The thermal reserve 237 of the inner bottom wall 223 can be formed by the inner bottom wall 223 having multiple layers. In the embodiment, the inner bottom wall 223 has a bottom sealing layer 225 and a puck 226. The puck 226 is positioned axially below the bottom sealing layer 225. The puck 226 is radially wider than the bottom sealing layer 225, however in various other embodiments the puck 226 is radially narrower than the bottom sealing layer 225.

The bottom sealing layer 225 may seal the bottom of the vacuum chamber 236. In the illustrated embodiment, the puck 226 is not relied upon to seal the vacuum chamber 236. The puck 226 is either directly connected to the bottom sealing layer 225 and/or to the sleeve 218. In this embodiment, the puck 226 is directly connected to the sleeve 218 by joint 244. Joint 244 may be a continuous (e.g., annular) or multipoint bond, such as with adhesive or welding.

In this embodiment, the puck 226 hangs below the bottom sealing layer 225. The puck 226 may be adjacent to the bottom side of the bottom sealing layer 225 such that the material (e.g., metal) of the puck 226 contacts the material (e.g., metal) of the bottom sealing layer 225. The puck 226 may only contact the bottom sealing layer 225 and/or the sleeve 218, any may not directly contact any other structures. The puck 226 may not be directly supported by any other component except the inner cup 240.

The puck 226 is axially thicker than the bottom sealing layer 225. The puck 226 can be at least two, three, five, or ten times axially thicker than the bottom sealing layer 225. The puck 226 in this embodiment includes a chamfer along corner 220 to accommodate bends in the outer bottom wall 24. The puck 226 can be disc shaped.

In various embodiments, the sleeve 218 is not present, and the puck 226 entirely forms the thermal reserve 237. In such case, the puck 226 can be directly connected to the bottom of the inner cup 240, such as bottom sealing layer 225. In various other embodiments, a sleeve 218 is present radially to the side of the inner cup 240, while no puck 226 is present, such that the sleeve 218 entirely forms the thermal reserve 237.

One or both of the sleeve 218 and the puck 226 may be entirely solid. For example, one or both of the sleeve 218 and the puck 226 may be formed from a single piece or type of metal, respectively. Alternatively, the sleeve 218 and/or the puck 226 may have a metal and/or polymer exterior shell and seal media (e.g., liquid or gel as previously described) within, sealed from the vacuum chamber 236. As such, each of the sleeve 218 and/or the puck 226 may define separate sealed media chambers filled with media as previously described.

Figures 11, 12:
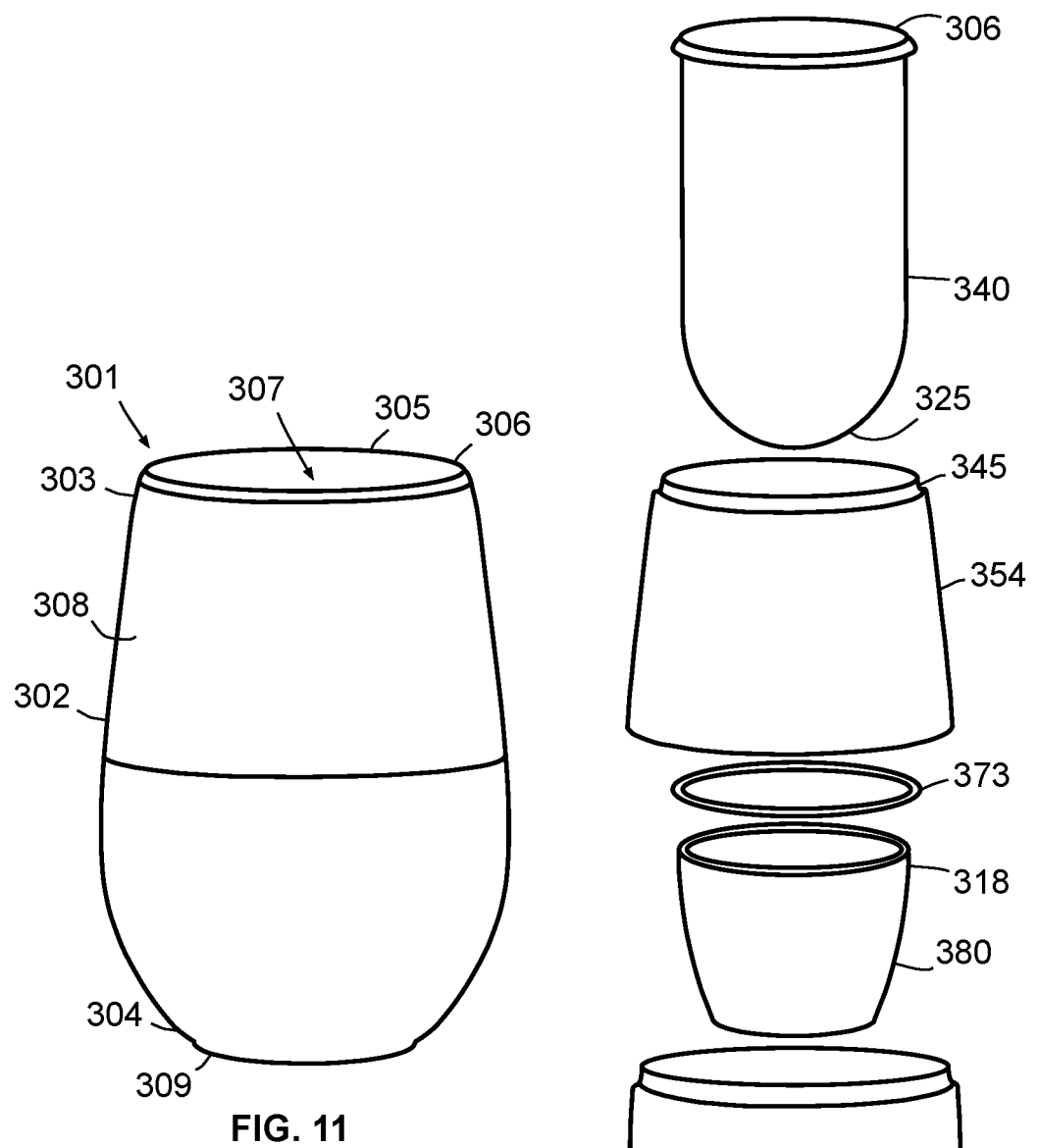
FIG. 11 shows a perspective view for a beverage container in a wine glass design.
FIG. 12 shows an exploded view for the beverage container of FIG. 11.
Figure 13:
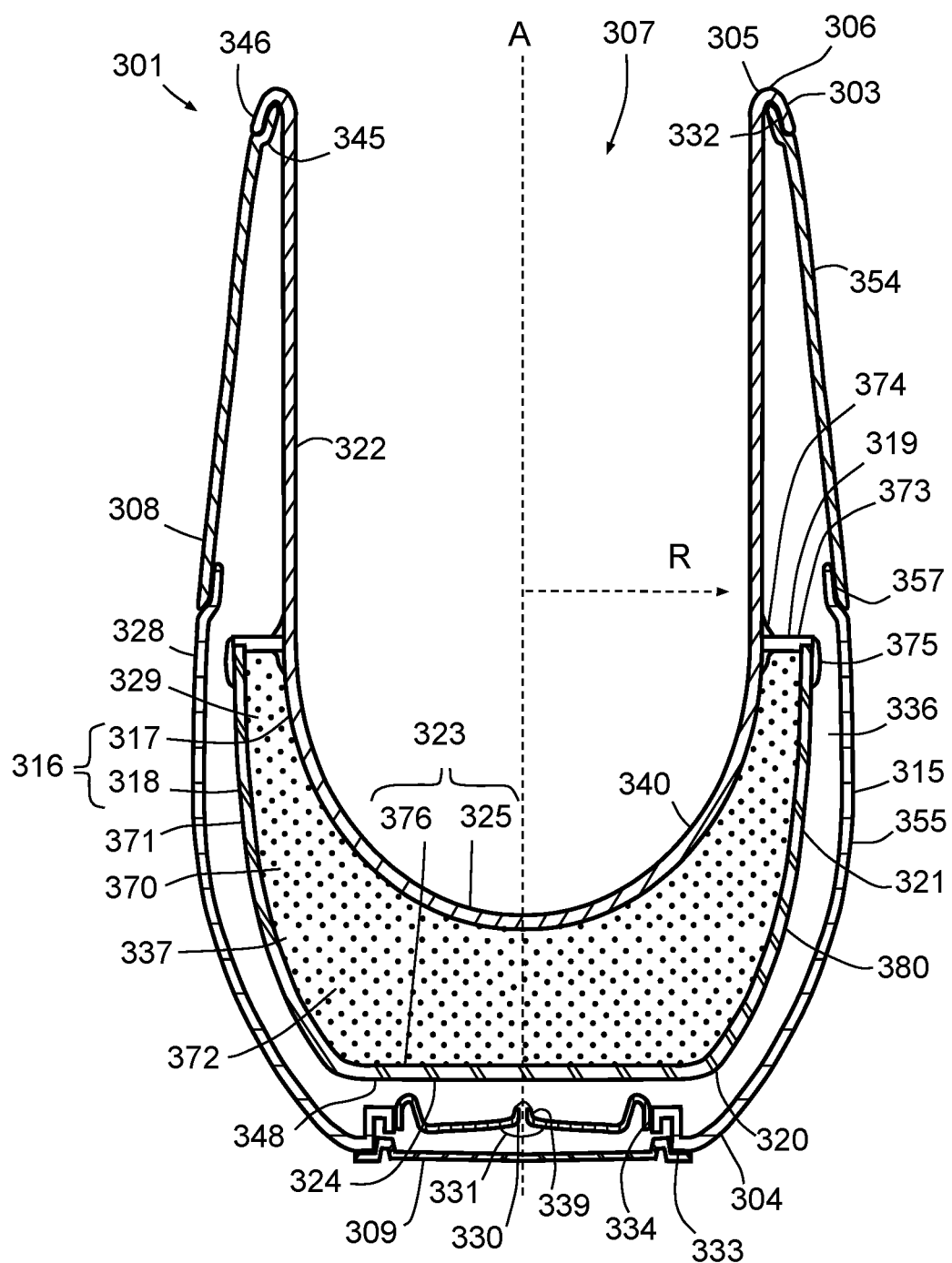
FIG. 13 shows a cross sectional view of the beverage container of FIGS. 11-12.

FIGS. 11-13 show a different embodiment of a beverage container having a thermal reserve as compared to the previous embodiments. Details of this embodiment that are redundant with the first, second, and/or third embodiments or other embodiments may not be repeated, with the understanding that the details of the above discussion apply to the fourth embodiment. For example, shapes, materials, properties, functions, relationships, etc. of parts with common reference numbers (e.g., 3, 302, 302, 302, or 37, 337, 337, 337) are assumed to be the same (or at least applicable) between embodiments unless specifically stated or shown to be incompatible, and are not repeated for brevity. Likewise, options and alternative feature described in relation to the first embodiment or other embodiments should be understood as also being applicable to this fourth embodiment.

FIG. 11 shows a perspective view of a beverage container 301. The beverage container 301 includes a container body 302. The beverage container 301 is in the style of a stemless wine glass. The container body 302 includes a top end 303, a bottom end 304, and an exterior surface 308. The bottom end 304 includes a shoe 309. An annular lip 306 is located at the top of the container body 302. The beverage container 301 includes an opening 305, in this case defined by the annular lip 306. Within the container body 302 is a hold 307 for containing a beverage.

FIG. 12 shows an exploded view (not done during working life) while FIG. 13 shows a cross sectional view of the beverage container 301 of FIG. 11.

The container body 302 includes an outer tubular sidewall 315. The outer tubular sidewall 315 defines the exterior surface 308. The outer tubular sidewall 315 is formed by an upper outer sidewall portion 354 and a lower outer sidewall portion 355. The upper outer sidewall portion 354 and the lower outer sidewall portion 355 together define the exterior surface 308. Each of the upper outer sidewall portion 354 and the lower outer sidewall portion 355 can be formed from respective pieces of metal. The upper outer sidewall portion 354 and the lower outer sidewall portion 355 may have the same radial thickness, or substantially the same radial thickness, between themselves and throughout their respective heights. The upper outer cylindrical sidewall portion 354 is connected to the lower outer sidewall portion 355 at joint 357.

The container body 302 includes an inner tubular sidewall 316. The material that forms the inner tubular sidewall 316 bends to form lip 306 and bends further to form overhang 346. An upper taper 345 in the outer tubular sidewall 315 fits within the overhang 346 to form joint 332. The inner tubular sidewall 316 defines the hold 307. A cylindrical surface defines part of the interior of the hold 307. This surface can be the inside of the inner tubular sidewall 316, and more specifically the side sealing layer 317. This surface can contact the beverage. The hold 307 is further defined by the inner bottom wall 323. The inner bottom wall 323 may also contact the beverage. The inner tubular sidewall 316 and the inner bottom wall 323 together form an inner cup 340 which can hold the beverage.

The container body 302 is generally formed by the inner tubular sidewall 316, the outer tubular sidewall 315, the inner bottom wall 323, and the outer bottom wall 324. Within and between these structures is formed a vacuum chamber 336. The vacuum chamber 336 is tubular about the hold 307 between the inner tubular sidewall 316 and the outer tubular sidewall 315. The vacuum chamber 336 further includes a planar section axially between the inner bottom wall 323 and the outer bottom wall 324. In another sense, the vacuum chamber 336 is formed radially between the inner tubular sidewall 316 and the outer tubular sidewall 315, and is formed axially between the inner bottom wall 323 and the outer bottom wall 324. The outer bottom wall 324 can be connected to the outer tubular sidewall 315 by joint 334. Joint 334 can be an annular airtight seal to maintain the vacuum chamber 336.

The inner tubular sidewall 316 can include an inner cylindrical portion 329. The outer tubular sidewall 315 can include an outer cylindrical portion 328.

In this embodiment, the inner tubular sidewall 316 is formed from multiple layers. Such layers include a side sealing layer 317 and a sleeve 318. The inner tubular sidewall 316 is attached to an inner bottom wall 323 that defines the floor of the hold 307. More particularly, the side sealing layer 317 is attached the bottom sealing layer 325 (and may be a contiguous material in various embodiments). The hold 307 is sealed by the side sealing layer 317 and the bottom sealing layer 325 to form inner cup 340. The inner cup 340 holds the beverage by directly contacting the beverage. The side sealing layer 317 is attached to an inner bottom wall 323 that defines the floor of the hold 307.

The sleeve 318 in this embodiment includes a sleeve sidewall 371 and a sleeve floor 376. The inner bottom wall 323 includes a bottom surface 348 that faces axially downward, into the vacuum chamber 336. The bottom surface 348 may be formed by the sleeve floor 376.

A shoulder 319 is formed by ring 373. Ring 373 is mounted on the inner cup 340. More specifically for this embodiment, the ring 373 is mounted on the side sealing layer 317. The ring 373 extends orthogonal to the side sealing layer 317, however other orientations are possible. An inner side of the ring 373 is connected to the side sealing layer 317 by joint 374. The top of the sleeve 318 is attached to the ring 373. An outer side of the ring 373 is connected to the sleeve 318 at joint 375. Each of joint 374 and joint 375 can be annular bonds that seal the vacuum chamber 336 from the sealed media chamber 370.

The joint 374 and the shoulder 319 can be below the neck 322. In this way, the neck 322 can be defined as extending upwards from the joint 374 and/or the shoulder 319 to the lip 306 and/or the opening 305. An inner cylindrical portion 329 can be defined as extending from one or both of the joint 374 and the shoulder 319, on its upper end, to corner 320.

The sleeve sidewall 371 is directly connected to the sleeve floor 376 to form outer cup 380. The inner cup 340 is attached to the outer cup 380 at the joint 374 via the ring 373 (and only directly at the joint 373 via the ring 373). Between the inner cup 340 and the outer cup 380 is formed sealed media chamber 370. The sealed media chamber 370 contains media 372. The media 372 can be as described elsewhere herein and serve as a thermal reserve 337 which can function as described elsewhere herein to stabilize the temperature of a beverage within the hold 307.

It is noted that part of the vacuum chamber 336 is directly axially above the shoulder 319 (and the sealed media chamber 370 and the media 372) due to the shoulder 319 projecting the trunk 321 radially into the vacuum chamber 336. Likewise, part of the vacuum chamber 336 is directly axially below the corner 320 and the sleeve floor 376.

It is noted that joint 357 between the upper outer cylindrical sidewall portion 354 and the lower outer sidewall portion 355 is located above the joint 374 and joint 375 to allow joint 374 and joint 375 to be made while the upper outer cylindrical sidewall portion 354 is in place but before the lower outer sidewall portion 355 is attached to the upper outer sidewall portion 354, which would otherwise block the making of one or both of joint 374 and joint 375.

A plug 331 within a port 330 of the outer bottom wall 324 can seal the vacuum chamber 336 during manufacturing, as previously described. The port 330 may be formed in a dimple 339 of the outer bottom wall 324. A joint 333 is formed as annular interface between the shoe 309 and the outer tubular sidewall 315. The outer bottom wall 324 can be connected to the outer tubular sidewall 315 by joint 334.

The following embodiment demonstrates features useable with disposable cups. Hot and cold drinks are commonly served in disposable paper or plastic cups. For example, paper cups (sometimes with an inner wax or polymer liner) are often used for serving hot drinks (e.g., coffee, expresso, cappuccino, and tea), and also cold drinks (e.g., cola and beer), with the intention that the paper cups are recycled, trashed, or otherwise disposed of and not reused. Plastic cups (having a widening opening, as distinct from a bottle having a narrowed opening) are often used for serving cold beverages such as water, cola, and beer, again with the intention that the cups are recycled, trashed, or otherwise disposed of and not reused. These paper and plastic cups are relatively poor insulators due to their inexpensive nature, leading to premature cooling or warming of the beverage which itself was often purchased as a premium drink (e.g., at premium coffee stores or at fast food restaurants). The beverage can be poured directly into a vacuum insulated beverage container from the disposable cup to minimize thermal transfer from the beverage over time, but that is impractical in many circumstances, such as with drive-throughs, long lines, and pre-poured beverages. The following embodiment concerns various options for holding a disposable cup in a vacuum insulated container.

Details of this embodiment (FIGS. 14-18) that are redundant with any of the previous embodiments will not be repeated, with the understanding that the details of the above discussion can apply to the fifth embodiment. For example, shapes, materials, properties, functions, relationships, etc. of parts with common reference numbers (e.g., 2, 102, 202, 302, 402 or 15, 115, 215, 315, 415, etc.) are assumed to be the same (or at least applicable) between embodiments unless specifically stated or shown to be incompatible, and are not repeated for brevity. Likewise, options and alternative feature described in relation to any of the previous embodiments should be understood as also being applicable to this fifth embodiment. This fifth embodiment of a container body 402 does not include a thermal reserve, however various other embodiments may include a thermal reserve, and a thermal reserve can be added according to any type referenced herein.

Figures 14, 15:
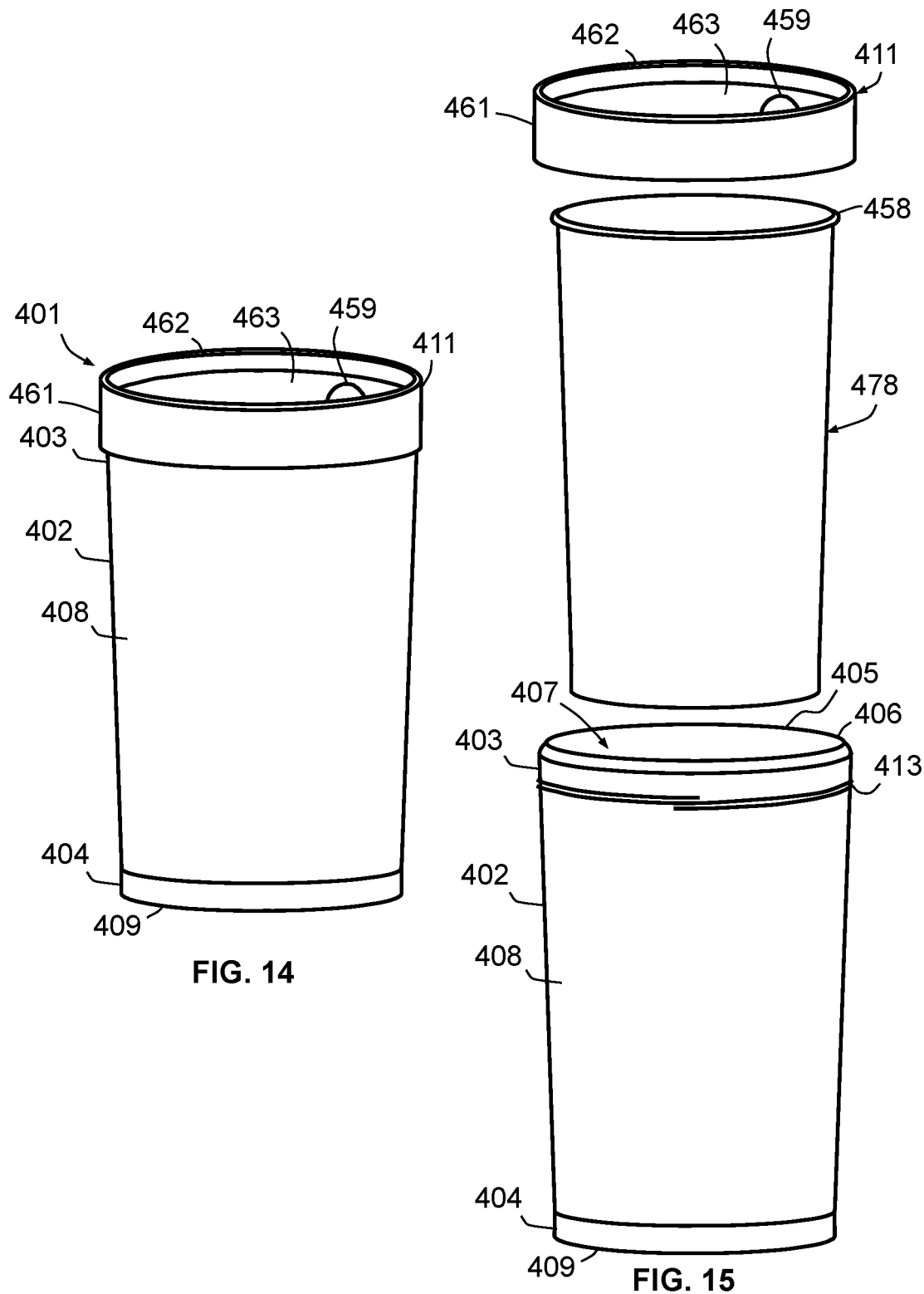
FIG. 14 shows a perspective view for a beverage container for holding a disposable cup.
FIG. 15 shows an unpacked view of the disposable cup having been removed from the beverage container of FIG. 14.

FIG. 14 shows a perspective view of a beverage container 401. The beverage container 401 includes a container body 402. The container body 402 includes an exterior surface 408, which can be cylindrical. In some embodiments, the container body 402 includes a handle extending laterally from its side. The container body 402 includes a top end 403 and a bottom end 404. The bottom end 404 includes a shoe 409 which supports the beverage container 401, and on which the beverage container 401 rests.

The beverage container 401 includes a cap 411. The cap 411 can be a disc. The cap 411 is selectively mounted to the top end 403 of the container body 402. While not shown in FIG. 14, but shown in subsequent images, the beverage container 401 includes a disposable cup 478 located within the container body 402, underneath the cap 411. The cap 411 includes an outer ring 461. The cap 411 includes an upper lip 462, which the user's mouth typically engages for drinking. The outer ring 461 is same diameter the upper lip 462, in this embodiment, and both may be part of the same ring. The cap 411 can be used with the previous container embodiments.

The outer ring 461 extends below the ceiling 463. Spanning within the outer ring 461 is ceiling 463. The upper lip 462 is located above the ceiling 463. The upper lip 462 can be the top end of the outer ring 461. Extending through ceiling is outlet aperture 459 through which beverage can flow from inside to the beverage container 401 to outside for consumption.

FIG. 15 shows the disposable cup 478 having been removed from the beverage container 401. The removal of the disposable cup 478 exposes a hold 407 which is an inner cavity configured for containing a beverage one or both of directly or within the disposable cup 478. An annular lip 406 is located at the top of the container body 402, defining an opening 405. When the cap 411 is mounted on the container body 402, the ceiling 463 can be positioned directly above the opening 405 and the hold 407.

The disposable cup 478 typically has a rim 458 on the top of the disposable cup 478, such as a rolled lip which is thicker (radially and/or axially) than the main body of the disposable cup 478. The rim 458 can be above the rest of the disposable cup 478. The rim 458 can be located radially outward of the rest of the disposable cup 478 (e.g., the rim 458 has the greatest diameter of the disposable cup 478). The disposable cup 478 is rigid and free standing and does not need to be supported when filled with a beverage, and thus is not floppy, a sack, or a mere liner. The floor of the disposable cup 478 is flat and the sidewall is tubular frustoconical.

The cap 411 can be mounted and fastened on the container body 402. The cap 411 can be fastened to the container body 402 by fastening 413. In this embodiment, the fastening 413 is threading on the interior of the outer ring 461 of the cap 411 which engages complementary threading located on the exterior surface 308 of the container body 402. Other fastening options besides threading are possible, such as press-fit, latch, and bayonet attachment features, for fixing the cap 411 on the container body 402.

In use, a disposable cup 478 containing a hot or cold beverage is placed within the hold 407 of the beverage container 401 when the cap 411 is not covering the opening 405 (e.g., the cap 411 is dismounted from the container body 402). Then when the disposable cup 478 is within the hold 407, the cap 411 is placed over the opening 405 and connected to the top container body 402, such as by engaging fastening 413 or other means of fastening the cap 411 to the top container body 402. The beverage can then be consumed through the outlet aperture 459. After the beverage is consumed, the cap 411 can be dismounted from the container body 402, such as by disengaging fastening 413. The first disposable cup 478 can then be removed from the hold 407 and then discarded. A new disposable cup 478 with more beverage can be placed in the hold 407, the cap 411 remounted, and the process repeated.

Figure 16:
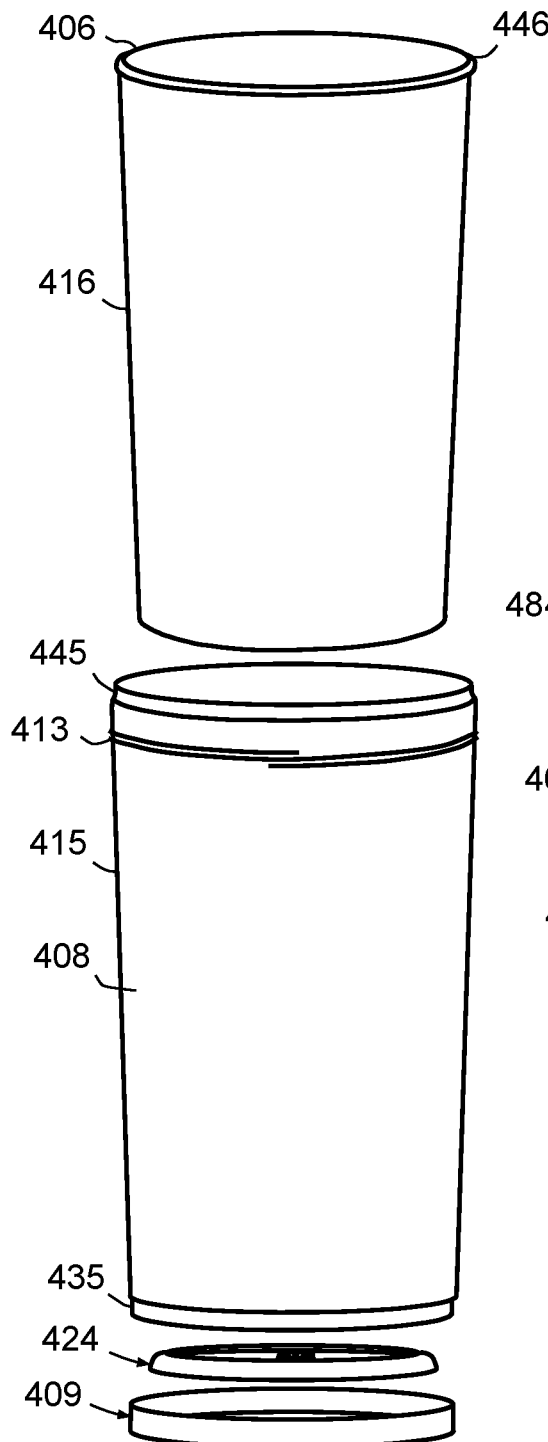
FIG. 16 shows an exploded view of the beverage container of FIGS. 14-15.

FIG. 16 shows an exploded view of the container body 402. While the disassembly shown in FIG. 15 would be common for exchanging disposable cup 478, the disassembly shown in FIG. 16 would not be done during the working life of the container body 402. As shown, the container body 402 is formed from a plurality of nested tubes. The tubes are typically coaxial about a vertical axis and radially overlapping when assembled.

As shown in FIG. 16, the container body 402 includes an outer tubular sidewall 415. The outer tubular sidewall 415 defines the exterior surface 408. The outer tubular sidewall 415 can be formed from a single piece of metal. In the illustrated embodiment, the outer tubular sidewall 415 includes a lower taper 435 which is a reduction in outer diameter to fit into the shoe 409.

The container body 402 includes an inner tubular sidewall 416. The inner tubular sidewall 416 defines the hold 407. In this embodiment, the inner tubular sidewall 416 is formed from one layer, however multilayer embodiments are possible, as previously shown herein. The walls of the container body 402 can be formed from metal. The outer tubular sidewall 415 can include an upper taper 445 to fit into an overhang 446 of inner tubular sidewall 416. Joint 432 can attach and seal the inner tubular sidewall 416 to the outer tubular sidewall 415.

The container body 402 can further comprise an outer bottom wall 424. The outer bottom wall 424 is round. As further shown herein, the outer bottom wall 424 can interface with the outer metal sidewall 15 (e.g., the lower taper 435 specifically) to seal a vacuum chamber.

Figure 17:
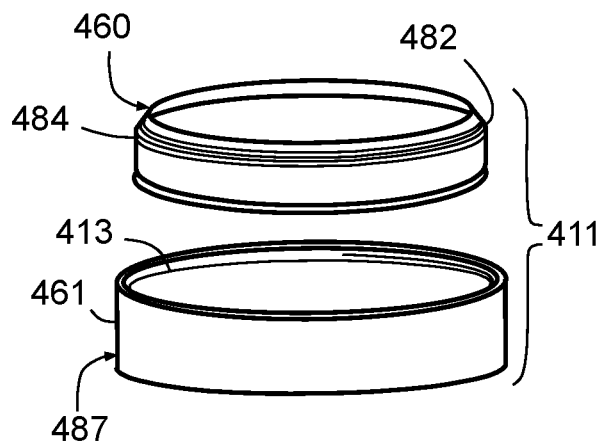
FIG. 17 shows an exploded view of a cap of the beverage container of FIGS. 14-15.

FIG. 17 shows the cap 411 in an exploded view, with the underside of the cap 411 facing upwards to show separation of an inner ring 460. The inner ring 460 is typically fixed to the rest of the cap 411 in use. The inner ring 460 is further discussed herein.

Figure 18:
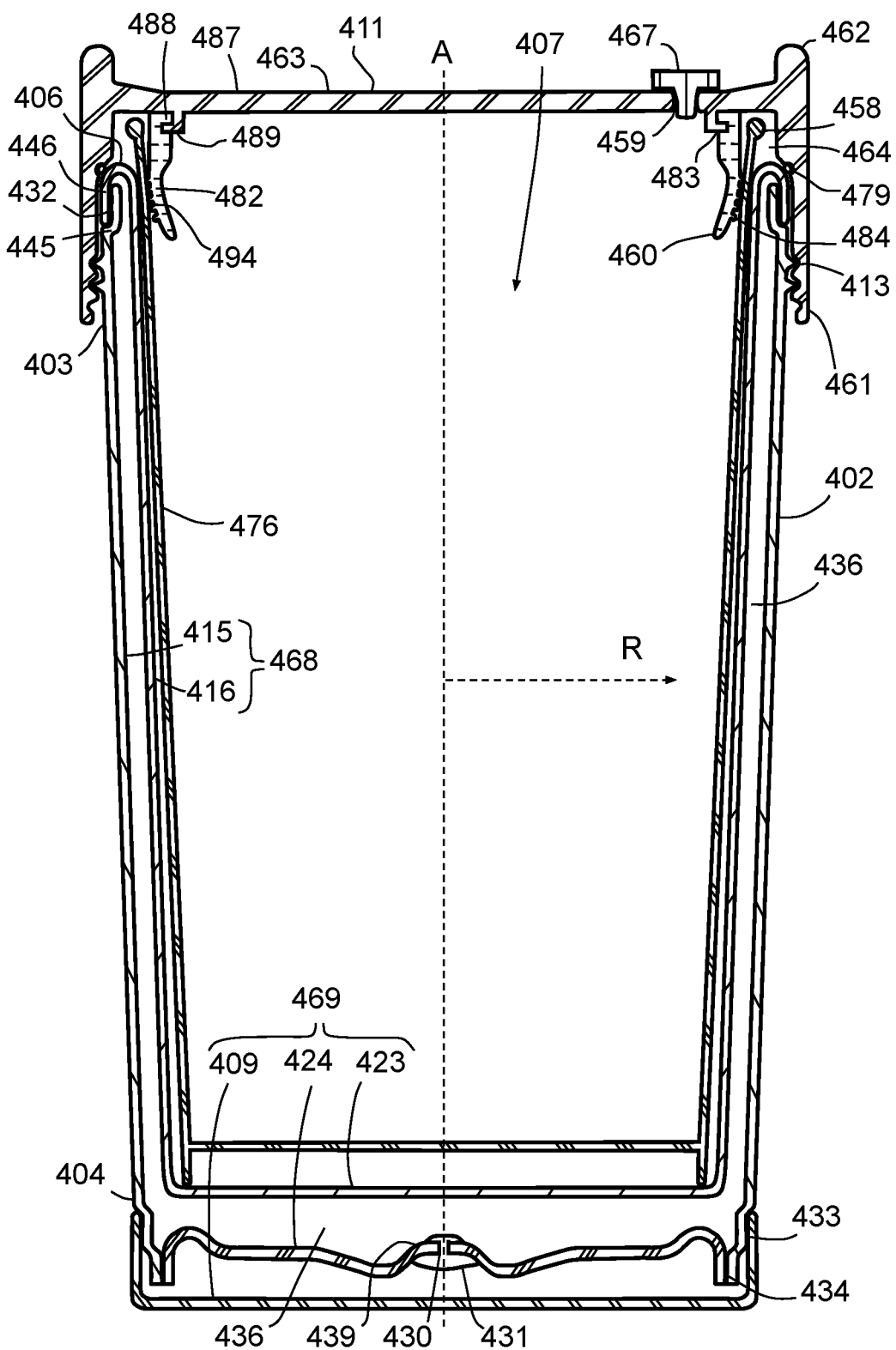
FIG. 18 shows a cross sectional view of the beverage container of FIGS. 14-17.

FIG. 18 is a cross-sectional side view of the beverage container 401. The beverage container 401 can be symmetric around the axis, so the two-dimensional view of FIG. 18 represents the entire structure 360° around the axis (except for outlet aperture 459). The axis corresponds with the long axis of the beverage container 401 as well as the disposable cup 478. The axis is coaxial with the long axis of the beverage container 401 as well as the disposable cup 478. The hold 407 is used to directly hold the disposable cup 478.

The container body 402 comprises a sidewall 468. The sidewall 468 is annular along the axis. The sidewall 468 defines both of the exterior surface 408 and the hold 407. The sidewall 468 in this embodiment is multilayered. More specifically, the sidewall 468 is formed by the outer tubular sidewall 415 and the inner tubular sidewall 416, including the vacuum chamber 436 there between. In various embodiments, the sidewall 468 is formed by a single wall (e.g., not double sidewall as shown) and/or does not include a vacuum chamber.

In the illustrated embodiment, the container body 402 is formed by floor 469. The floor 469 defines both a ground-contacting surface of the container body 402 as well as the bottom of the hold 407. The floor 469 is multilayered in this embodiment. More specifically, the floor 469 includes shoe 409, the outer bottom wall 424, and an inner bottom wall 423, including a vacuum chamber 436 between the outer bottom wall 424 and inner bottom wall 423. In various embodiments, the floor 469 is formed by a single wall (e.g., not triple bottom wall as shown) and/or does not include a vacuum chamber.

The outer bottom wall 424 can be connected to the outer tubular sidewall 415 by joint 434. A plug 431 within a port 430 of the outer bottom wall 424 can seal the vacuum chamber 436 during manufacturing. The port 430 may be in a dimple 439 in the outer bottom wall 424. A joint 433 forms an annular interface between the shoe 409 and the outer tubular sidewall 415.

The cap 411 includes an inner ring 460 and an outer ring 461. As shown, the inner ring 460 is coaxial with the outer ring 461. Also, the outer ring 461 radially overlaps the inner ring 460, such that the inner ring 460 is radially within the outer ring 461. Both of the inner ring 460 and the outer ring 461 are attached to the ceiling 463. The ceiling 463 can span within the ring formed by the upper lip 462 and/or outer ring 461. The ceiling 463 is shown as a single layer, but can be multi-walled. The inner ring 460 is mounted to the ceiling 463 and extends downward from the ceiling 463. The outlet aperture 459 extends through the ceiling 463 to allow flow of the beverage from the hold 407 during when the beverage container 401 is partially or fully inverted for drinking. A closure 467 can seal the outlet aperture 459 to prevent escape of beverage out of the outlet aperture 459 unless the closure 467 is removed from the outlet aperture 459. The closure 467 may be tethered to the ceiling 463. The closure 467 may be press fit into the outlet aperture 459, or may only cover the outlet aperture 459. The closure 467 may be a polymer.

The cap 411 includes inner fastening 413 which interfaces with complementary outer fastening 413 of the container body 402. More specifically in this embodiment, inner threading is located on the radial inside of the outer ring 461. Rotating the cap 411 relative to the container body 402 in a first direction can secure the cap 411 to the container body 402, trapping the disposable cup 478 within the hold 407, such that the cap 411, the container body 402, and the disposable cup 478 become a single assembly. Rotating the cap 411 about the container body 402 in a second direction can unsecure and dismount the cap 411 from the container body 402, allowing removal of the disposable cup 478 from within the hold 407.

The cap 411 includes a cap body 487. The cap body 487 can form most or all of the cap 411 in various embodiments. In this embodiment, the cap body 487 includes the ceiling 463, the outer ring 461, and the upper lip 462, which are all formed from one contiguous piece of material (e.g., polymer). In this embodiment, the inner ring 460 is formed separately from the cap body 487 and then joined to the cap body 487 via fastener 483, however the inner ring 460 can be part of the cap body 487 in various other embodiments.

In the illustrated embodiment, the fastener 483 comprises a first annular flange 488 on the top of the inner ring 460. In the illustrated embodiment, the fastener 483 comprises a second annular flange 489 on the underside of the cap body 487, or more narrowly on the underside of the ceiling 463. The second annular flange 489 is located radially inside of the outer ring 461. The first annular flange 488 interlocks with the second annular flange 489. More specifically, the first annular flange 488 interfaces and axially overlaps with the second annular flange 489. As shown, the first annular flange 488 is trapped axially between, and in contact with, the second annular flange 489 and the cap body 487 (or more specifically the ceiling 463). The interlocking holds the first annular flange 488 to the second annular flange 489, and consequently, the inner ring 460 to the cap body 487. This fastener 483 design may provide several benefits. It allows the inner ring 460 to rotate relative to the cap body 487. Specifically, the first annular flange 488 can rotate relative to the second annular flange 489. The fastener 483 design also seals the inner ring 460 to the cap body 487 to prevent leakage of beverage past the interface between the inner ring 460 and the cap body 487. The seal is a labyrinth seal in that beverage would need to take multiple 90 degrees turns along interfacing parts to go from within the hold 407, past the seal formed by fastener 483 (e.g., three or more turns). The first annular flange 488 is radially outward of the second annular flange 489. This arrangement may be useful because the material forming the inner ring 460 may be more flexible, such that stretching the first annular flange 488 outward to fit around the second annular flange 489 locks the first annular flange 488 onto the second annular flange 489, such that the first annular flange 488 would need to be stretched outward again to release from the second annular flange 489.

It is noted that alternative designs for the fastener 483 is possible. For example, the cap body 487 may include an annular cavity, such as on the underside of the ceiling 463, that a bulbous top part of the inner ring 460 is inserted into to form a press-fit connection that seals while supporting independent rotation of the inner ring 460.

When the cap 411 is mounted on the container body 402, the inner ring 460 extends through the opening 405 and into the hold 407 while the outer ring 461 extends along the exterior surface 408. As shown, the inner ring 460 extends inside of the disposable cup 478. In this way, part of the sidewall 468 is directly radially between the inner ring 460 and the outer ring 461. More specifically, part of the sidewall 468 is directly radially outward of the inner ring 460 and the disposable cup 478 and directly radially inward of the outer ring 461. Furthermore, part of the vacuum chamber 436 is directly radially between the inner ring 460 and the outer ring 461. More specifically, part of the vacuum chamber 436 is directly radially outward of the inner ring 460 and the disposable cup 478 and directly radially inward of the outer ring 461. As such, part of one or both of the outer tubular sidewall 15 and the inner tubular sidewall 16 are directly radially between the inner ring 460 and the outer ring 461.

When the cap 411 is mounted on the top end 403 of the container body 402, the inner ring 460 extends through the top opening of the disposable cup 478 and into the disposable cup 478. The inner ring 460 engages an inner annular surface 494 of the disposable cup 478. This forms an annular seal within the disposable cup 478 so that the beverage cannot pass between the inner annular surface 494 and the inner ring 460, trapping the beverage between the disposable cup 478 and the cap 411, such that the beverage can only exit through the outlet aperture 459. The annular engagement that forms this seal is below the lip 406 and below the rim 458. In various embodiments, the rim 458 is not pinched. For example, the rim 458 is not pinched axially and/or radially. No seal is made with the rim 458, as distinguished from sealing to the rim with a conventional disposable lid that is mounted on the disposable cup 478 at sale.

As shown, the rim 458 is above, and separated, from the lip 406. The rim 458 does not make contact with the lip 406. In the particular embodiment, the rim 458 does not contact that container body 402 and does not contact the cap 411.

As shown, the inner ring 460 engages the inner annular surface 494 inside of the disposable cup 478 to press the outside of the disposable cup 478 against the container body 402. Specifically, the outside of the disposable cup 478 is pressed against the inside of the sidewall 468. However, depending on the strength of the wall of the disposable cup 478 and its degree of outward deflection upon being pressed by the inner ring 460, an annular engagement may be generated between the outside of the disposable cup 478 and the inside of the sidewall 468, radially overlapping with the inner ring 460 and the inner annular surface 494.

The inner ring 460 includes an annular projecting seal 484. The annular projecting seal 484 is located on the radially outward surface of the inner ring 460. The annular projecting seal 484 extends toward the outer ring 461. In this case, the annular projecting seal 484 includes a plurality of annular ridges arrayed along the axis. Each ridge can engage the inner surface of the disposable cup 478 to seal with the inner surface of the disposable cup 478. Multiple ridges are provided to generate redundant seals and also to axially spread out along the inner annular surface 494 to seat so that at least one seats in an ideal sealing area with the disposable cup 478 which may be useful with different sized and/or angled disposable cups.

The inner ring 460 includes an annular bend 482. The annular bend 482 extends entirely around the inner ring 460. The annular bend 482 may engage the annular inner surface of the disposable cup 478 to form the annular seal with the disposable cup 478. The annular bend 482 may represent a change in diameter of the inner ring 460 between a larger diameter upper part and a smaller diameter lower part. A top diameter of the inner ring 460 is larger than a bottom diameter of the inner ring 460. As shown, the lower part of the inner ring 460 is angled radially inward. The inwardly angled, narrower lower part may be easier to lead insertion into the disposable cup 478 while the wider annular bend 482 follows to wedge against the inner annular surface 494 of the disposable cup 478 to form the annular seal with the disposable cup 478.

The inner ring 460 hangs down free from the cap body 487 and/or the ceiling 463. At least the lower half of the inner ring 460 hangs free as a ring and is not connecting to any other parts of the cap 411. There is no ceiling or floor that spans at least the lower half of the inner ring 460. This allows the lower part of the inner ring 460 to bend to help create the annular seal. Also, in case the beverage level is particularly high, then dipping only the inner ring 460 into the beverage within the disposable cup 478 minimizes the displacement of the beverage by the cap 411 because the beverage can merely fill up the space within the inner ring 460.

In this embodiment, the inner ring 460 is formed from a different material as the rest of the cap 411. More specifically, the inner ring 460 is formed from a first type of material (e.g., polymer, such as polytetrafluoroethylene, silicone, or rubber) while the cap body 487 is formed by a second type of material (e.g., polymer, such as polycarbonate) that is different than the first type. The components formed from the second type of material may be the upper lip 462, outer ring 461, and/or ceiling 463. The material that forms the inner ring 460 may be more flexible and/or softer than the material that forms the cap body 487 (e.g., the outer ring 461, the ceiling 463, and/or the upper lip 462). The more soft, flexible material of the inner ring 460 can provide better sealing with the inner annular surface 494 of the disposable cup 478, while the material that forms the cap body 487 can be harder and stiffer to withstand impacts due to being external materials and securely grip the fastening 413. The flexibility of the material of the inner ring 460 may allow the inner ring 460 to flex radially inwards when engaging and sealing with the disposable cup 478, as shown, to conform to the particular size of the inner annular surface 494.

Due to the fastener 483, the inner ring 460 can rotate relative to the cap body 487 (e.g., the outer ring 461, the ceiling 463, and/or the upper lip 462), so that when the ceiling 463 and/or the outer ring 461 are rotated to engage and secure fastening 413, the inner ring 460 does not necessarily have to likewise rotate to minimize pulling or tugging on the potentially delicate inner annular surface 494 of the disposable cup 478.

The outer ring 461 is radially thicker than the inner ring 460. The difference if material thickness allows the inner ring 460 to be flexible for sealing while the outer ring 461 is thicker to structurally mount on the container body 402. The outer ring 461 extends below the inner ring 460, however in various other embodiments the inner ring 460 extends below the outer ring 461.

An annular cavity 464 is located in the cap 411, radially between the inner ring 460 and the outer ring 461. The annular cavity 464 is below the ceiling 463, and may directly below the ceiling 463. The annular cavity 464 is below the upper lip 462. When the cap 411 is mounted on the tumble body 402, the annular cavity 464 can be located directly above the sidewall 468. When the cap 411 is mounted on the tumble body 402, the annular cavity 464 can be located directly above the lip 406. The annular cavity 464 can be defined radially by the inner ring 460 and the outer ring 461. The top of the annular cavity 464 can be defined axially by the ceiling 463 or other part of the cap 411. The bottom of the annular cavity 464 can be defined axially by the container body 402, such as the sidewall 468 and/or lip 416 or other part of the container body 402. The annular cavity 464 can be located directly above the vacuum chamber 436.

The rim 458 of the disposable cup 478 is typically thicker than the sidewall of the disposable cup 478 and can serve several functions, such as structural reinforcement to maintain the round opening of the disposable cup 478, as an engagement feature for the drinker's lips when drinking directly from the disposable cup 478, and/or as a mounting feature for disposable lids. However, the rim 458 does not serve those purposes when used with the beverage container 401 so the annular cavity 464 provides a space to accommodate the rim 458.

As shown, the annular cavity 464 provides a space for the top of the disposable cup 478. For example, the annular cavity 464 provides space for the rim 458 of the disposable cup 478. The annular cavity 464 can be radially wider (as measured by the radial separation distance between the inner ring 460 and the outer ring 461) than the rim 458 of the disposable cup 478 so that the rim 458 can be within the annular cavity 464 without being crushed or otherwise deformed. Within the annular cavity, the disposable cup 478 may not touch the surfaces of the cap 411 that define the annular cavity 464. In particular, the rim 458 may not touch the surfaces of the cap 411 that define the annular cavity 464. This protects the integrity of the disposable cup 478, particularly the rim 458, to avoid crushing or deforming that may otherwise tear or otherwise breach the disposable cup 478 and risk leaking of beverage. However, the rim 458 may contact the defining surfaces of the annular cavity 464 in various embodiments.

It is noted that the annular seal formed by the interface between the inner ring 460 and the inner annular surface 494 of the disposable cup 478 is located below the rim 458 of the disposable cup 478 and below the annular cavity 464. This protects the integrity of the rim 458, to avoid crushing or deforming that may otherwise tear or otherwise breach the rim 458 which is particularly structurally important to the disposable cup 478. Instead, the disposable cup 478 is annularly pinched below the rim 458 by and between the inner ring 460 and the sidewall 468.

Part of the vacuum chamber 436 is located directly radially between the inner ring 460 and the outer ring 461. The annular cavity 464 is directly above the vacuum chamber 436.

In this embodiment, the cap 411 includes an annular seal ring 479. The annular seal ring 479 may be mounted on the outer ring 461. The annular seal ring 479 is located below the ceiling 463. The annular seal ring 479 is located directly radially between the inner ring 460 and the outer ring 461. The annular seal ring 479 can be partially located within an annular recess of the cap 411 to anchor the annular seal ring 479 to the cap 411 while partially exposing the annular seal ring 479. The exposed part of the annular seal ring 479 can engage the container body 402 to form an annular seal to prevent beverage leaking past the annular seal ring 479. The annular seal ring 479 may form a secondary, backup seal to prevent beverage that may have already passed the annular seal between the interfacing surfaces of the inner ring 460 and the disposable cup 478 from escaping through the gap between the cap 411 and the container body 402. The annular seal ring 479 may engage the sidewall 468. The annular seal ring 479 may engage the lip 406. The annular seal ring 479 may be formed from a flexible, elastic material, such as a polymer (e.g., PTFE, silicone, rubber). The annular seal ring 479 may be formed from a different material as the rest of the cap body 487 (e.g., the outer ring 461, the ceiling 463, and/or the upper lip 462).

The tubular sidewall of the disposable cup 478 is sloped (e.g. linear slope) such that the top of the disposable cup 478 is wider than the bottom of the disposable cup 478, both within the hold 407 and on the exterior surface 408. The slope can be linear and/or continuous. The surface of the sidewall 468 that forms the hold 407 is sloped, such that the hold 407 is narrower at the inner bottom wall 423 and wider at the lip 406. The slope can be linear and/or continuous. In this way, the tubular sidewall of the disposable cup 478 is sloped in the same direction as the sidewall 468 of the container body 402 (e.g., narrowing downward). Such similar sloped profile in the walls may allow greater engagement between the radial exterior surface of the tubular sidewall of the disposable cup 478 and the radially interior surface of the sidewall 468 (defining the hold 407) to support the disposable cup 478 within the hold 407.

The top of the disposable cup 478 extends above the lip 406 of the container body 402 when the disposable cup 478 sits in the hold 407. The disposable cup 478 is taller than the hold 407. This may be the case when the bottom of the disposable cup 478 rests of the floor (e.g., inner bottom wall 423) of the hold 407. The top of the disposable cup 478 extend up beyond the lip 406 and allows the disposable cup 478 to be placed in the hold 407 while containing a beverage (e.g., by the user gripping the rim 458), instead of simply dropping the disposable cup 478 with beverage inside into a hold 407 that is deeper than the disposable cup 478 itself, which risks damaging the disposable cup 478 and spilling or leakage of the beverage. Also, the top of the disposable cup 478 extending above and beyond the lip 406 allows the disposable cup 478, particularly the rim 458, to be gripped by hand for easy lifting of the disposable cup 478 and removal of the disposable cup 478 from the hold 407 without having to dig the rim 458 out from within the hold 407. However, depending on the height of the disposable cup 478, the disposable cup 478 may not extend above the lip 406 while the disposable cup 478 is within the hold 407. Still, the annular seal may be generated to seal with the annular inner surface of the disposable cup 478 to seal the beverage between the disposable cup 478 and the cap 411.

In operation, the disposable cup 478 filled with beverage is placed within the hold 407 and then the cap 411 is mounted on the container body 402. Then beverage is consumed through the outlet aperture 567. After partial or complete consumption, the cap 411 is dismounted from the container body 402 by disengaging fastening 413 and moving the cap 411 axially relative to the container body 402. In some cases, the disposable cup 478 will remain in the hold 407 while the cap 411 is lifted away, terminating the annular seal with the inner annular surface 494 of the disposable cup 478 and the inner ring 460. The disposable cup 478 remaining in the hold 407 may depend on the volume of beverage reaming in the disposable cup 478, which weighs the disposable cup 478 down, and any suction force generated within the hold 407 below the disposable cup 478 that resists removal of the disposable cup 478 from the hold 407. In other cases, the interference between the inner ring 460 and the inner annular surface of the disposable cup 478 is sufficient to overcome either of these forces such that the disposable cup 478 remains attached to the cap 411, the inner ring 460 specifically, and the disposable cup 478 lifts out of the hold 407 when the cap 411 is moved axially away relative to the container body 402. In such a case, the disposable cup 478 can be pulled axially downward relative to the cap 411 to overcome the stiction force between the inner ring 460 and the inner annular surface 494 of the disposable cup 478 to separate the disposable cup 478 from the cap 411.

While the use of a disposable cup 478 within the beverage container 401 has been demonstrated, the beverage container 401 can be used to contain, insulate, and facilitate consumption of a beverage within the hold 407 without a disposable cup 478. In such a case, beverage container 401 has dual utility in being useable with a disposable cup 478 and without one as well. Without a disposable cup 478, the beverage can be poured directly into the hold 407. The beverage can directly contact the sidewall 468 (e.g., the inner tubular sidewall 416) and the floor 469 (e.g., the inner bottom wall 423). The cap 411 can be secured onto the top of the container body 402 as previously described, with the inner ring 460 engaging with an inner annular surface of the sidewall 468, below the lip 406 to generate an annular seal between the inner ring 460 and the upper part of the sidewall 468. The annular seal may be generated between a radially outward annular surface of the inner ring 460 (e.g., the annular projecting seal 484) and the upper part of the sidewall 468 within the hold 407. The annular seal may prevent the beverage from escaping the hold 407 except through the outlet aperture 459.

Figure 19:
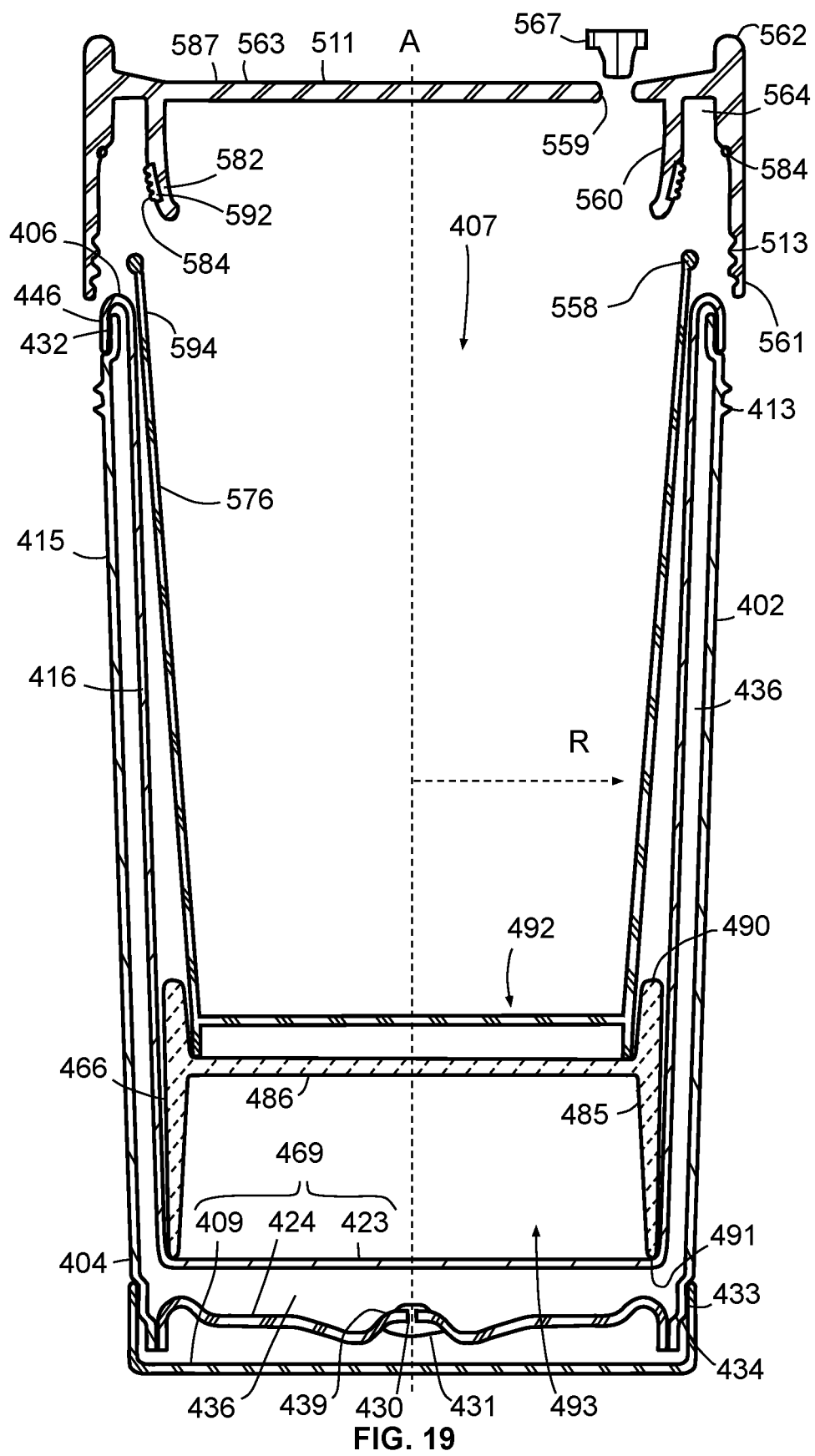
FIG. 19 shows a cross sectional view of the beverage container of FIGS. 14-18 but accommodating a different sized disposable cup with use of a stand and having a different cap.

FIG. 19 is a cross sectional view similar to that of FIG. 18 but shows the use of a stand 466 to support use of different sized disposable cup 578. The container body 402 is the same as in FIG. 18. However, a different cap (cap 511) is used to demonstrate various cap features that can additionally/alternatively be used. The cap 511 can be the same as the cap 411, and the above referenced aspects regarding cap 411 apply equally to cap 411, including but not limited to when similar base reference numbers are used (e.g., 487, 587), except where shown or described to be incompatible. Common aspects may not be repeated between embodiments, but are applicable. The disposable cups 578 can be identical to that of disposable cup 478 except being of a different size by having a different height.

FIG. 19 demonstrates a variation in the construction of the cap 511. Similar to the previous cap, the cap 511 includes outer ring 461 and a ceiling 563 that spans within, and to, the outer ring 561. Fastening 513 is formed on the inside of the outer ring 561 that is complementary with fastening 413 on the container body 402. An upper lip 562 is formed. An annular projecting seal 584 is located on the outer ring 561. An outlet aperture 559 is formed through the ceiling 559, and a closure 567 can selectively seal the outlet aperture 559.

In this version, the inner ring 560 is part of the cap body 587. In this way, the inner ring 560 is formed from the same type of material as, and is contiguous with, the ceiling 563 and the outer ring 561. An annular cavity 564 is formed between the inner ring 560 and the outer ring 561. A bend 582 is formed in the inner ring 560.

The inner ring 560 includes a band 592. The band 592 is formed from a flexible material (e.g., rubber, silicone) that is softer than the material that forms the cap body 587. The band 592 can be annular about the axis. The band 592 can be elastic to retain itself on the inner ring 560. The band 592 can be mounted on a radially outward facing annular recess on the inner ring 560. The band 592 can form annular projecting seals 584. The band 592 can be the part of the inner ring 560 that engages the inner annular surface 594 of the disposable cup 478 for sealing.

Disposable cups 478, 578 often come in multiple sizes (e.g., small, medium, and large), the size typically depending on the height of the disposable cups 478, 578 to contain different beverage volumes. However, the diameter of the rim 458, 558 of the disposable cups 478, 578 is often the same amongst the different sizes so that a single size of disposable lid will fit on the rim 458, 558 of all sizes of disposable cups 478, 578, thereby simplifying the cup/lid supply chain and in-store assembly procedure. Due to this top-end sizing similarity, multiple different sizes of disposable cups 478, 578 can be held within the beverage container 401, with the rim 458, 558 being positioned above the lip 407, within the annular cavity 464, to seal with the inner ring 460 as previously described. In such cases, a stand 466 is placed within the hold 407 to account for height differences amongst the different sizes of the disposable cups 478, 578.

FIG. 19 shows how different size of a disposable cup 578 can be accommodated, such as small, medium, and large. A stand 466 can be absent (FIG. 18, for a large size) or present in the hold (FIG. 19 for a small size). Further, the stand 466 can be flipped relative to the orientation shown in FIG. 19 to change the amount of height boost that the stand 466 provides, which such case would support a medium size beverage cup.

The stand 466 includes a first axial end 490 and a second axial end 491 opposite the first axial end 490. In this example, the first axial end 490 is facing upwards within the hold 407 and engages the disposable cup 578 while the second axial end 491 is facing downwards within the hold 407 and engages the floor 469. The stand 466 can be flipped so that the first axial end 490 is facing downwards within the hold 407 and engages the floor 469 while the second axial end 491 faces upwards within the hold 407 and engages the disposable cup 578.

The stand 466 includes a base 485 and a floor 486. The base 485 is cylindrical in this embodiment, but may not be cylindrical in various other embodiments. The base 485 can be tubular. The floor 486 is radially within the base 485. The floor 486 spans the tubular sidewall that forms the base 485. The floor 486 provides a support on which the bottom end of the disposable cup 578 can engage and be supported. The floor 486 is not equidistant between the first axial end 490 and a second axial end 491, such that the floor 486 is at different heights depending on the orientation of the stand 466 (e.g., first axial end 490 up or second axial end 481 up), which allows the stand 466 to support disposable cups of different heights. The base 485 and the floor 486 define a first cavity 492 which is open on the first axial end 490. The first cavity 492 defines an annular step so that an inward facing surface of the sidewall of the base 485 can engage the side of the disposable cup 578 and support the disposable cup 578 laterally (e.g., when the beverage container 401 is tipped to its side during drinking of the beverage). The base 485 and the floor 486 define a second cavity 493 which is open on the second axial end 491. The second cavity 493 defines an annular step so that the sidewall of the base 485 can engage the side of the disposable cup 578 and support the disposable cup 578 laterally.

As shown, the rim 558 of the different sized disposable cup 578 (relative to FIG. 18) can still be located above the lip 407 or otherwise having the relationships previously described due to the use of the stand 466. The stand 466 can be symmetric around the axis AA, such that what is shown in FIG. 19 represents the entire round stand 466 about the axis AA.

Inventive aspects of the present disclosure can be realized in various other beverage containers, such as bottles and jugs (e.g., having narrower top ends). Any of the embodiments referenced herein can include a handle extending laterally from the side of the container body, such as a "U" or loop which can be gripped by hand. The exteriors of containers and/or the interiors of holds can be frustoconical, bring wider upwards and narrower downwards.

Various beverage container embodiments do not contain electronics, such as no battery, electrical circuits, and further no heating elements (e.g., via electrical, chemical, combustion). However, such features could be incorporated.

Comparisons made herein that one or more components can have greater heat capacity than one or more other components are comparing total heat capacity of the referenced material, and not a comparison of relative heat capacity by weight or volume. Comparisons of radial thicknesses of two different parts, such as radial thicknesses of an inner tubular sidewall and an outer tubular sidewall, can compare thicknesses at equal heights along the axis, at radially overlapping portions. Comparisons of axial thicknesses of two different parts, such as axial thicknesses of an inner bottom wall and an outer bottom wall, can compare thicknesses at common radial locations (parallel with the axis). Comparisons of radial thicknesses may only compare radially overlapping portions of the referenced parts. Diameters are measured along the radial direction, orthogonal to the axis AA.

It is noted that the materials referenced herein may be coated, such as with paint, polymer (e.g., rubber), ceramic, or other coating. Therefore, while a wall (including a layer, sleeve, floor, etc.) may be metal, the entirety of the wall may not be metal. A wall may include non-metal parts, such as polymer, rubber, or foam. For example, an outer tubular sidewall may include layers or other parts that are not metal, such as one or more coatings (e.g., exterior paint and/or interior radiation reflective coating), or a ceramic coating on an inner tubular sidewall and inner bottom wall. Each of the walls, and layers that compose the walls, as well as other parts, can be a respective single piece of metal that is extruded as a tube and then rolled to form the particular profile shown and/or stamped and reformed (e.g., with hydroforming to blow out shapes). Possible types of metal for the referenced parts herein include stainless steel, aluminum, and/or brass, amongst other options. Any wall (including a layer, sleeve, floor, etc.) or other component referenced herein can be formed from metal. These pieces of metal can have layers applied, such as paint, polymer, sealant, adhesive, and reflective substrate, amongst other options, to form a wall that is composite. The metal can be extruded as a tube and then rolled to form the particular profile shown and/or hydro-formed, amongst other options.

The term cylindrical as used herein does not mean that a corresponding surface or component that is cylindrical has a constant diameter. Rather, the diameter can change along its length, unless specified to have a constant diameter. Cylindrical does not necessarily mean that the outer surface is perfectly circular, as ovular or faceted (e.g., octagonal profiles) can also be cylindrical, unless otherwise noted. Likewise, the term tubular does not necessarily mean that a corresponding surface or component that is tubular has a constant diameter, rather the diameter can change along its length, unless specified to have a constant diameter.

The beverages referenced herein may be consumed via a straw that extends through the tumbler opening and, if included, the outlet aperture of a cap.

A statement that the vacuum chamber is atmospherically sealed by each of the inner tubular sidewall, the outer tubular sidewall, inner bottom wall, and/or the outer bottom wall does not necessarily mean that the vacuum chamber is sealed by only these structures, unless it is stated that only these structures form the walls that seals the vacuum chamber. Intermediary structures may also help seal. A vacuum space may be entirely devoid of material, including gas.

Various joints are referenced herein, joining two pieces. Any such joints can be annular about the axis AA. Any joint may seal. Any joint can be formed by welding, swaging, brazing, adhesive, press fitting, or other manner of attachment of two pieces. Likewise, any two pieces shown or described as connected can be joined by these techniques.

Two components that are described as connected are not necessarily in contact with each other without an intermediary component, unless it is specified that they are directly connected, in which case the two components are in contact with each other. Although not necessarily stated, any two materials that are contacting in any of the FIGS. can be described (e.g., specifically claimed) as directly connected, and any two components described herein as being connected can be described (e.g., specifically claimed), optionally, as directly connected.

Optional language is used herein describing what "can" or "may" be present, or what "various" embodiment may include, not what is or must necessarily be present. Therefore, if in reference to an embodiment, it is stated that an aspect "may" or "can" be present, then the option can be included, or left out, of the embodiment, particularly in a claim. Each sentence or paragraph can refer to multiple, independent aspects. A claim can be amended with a select word or phrase from a sentence or paragraph without taking the whole sentence or paragraph. The walls shown in the embodiments may be the only walls of the particular containers. For example, the outer tubular wall may be the outermost wall of the container body. No wall may be present directly radially between the inner tubular sidewall and the outer tubular sidewall. No wall may be present axially between the inner bottom wall and the outer bottom wall. No wall may be present axially between the axis and the inner tubular sidewall (e.g., defining hold).

The present disclosure is made using several embodiments to highlight various inventive aspects. Modifications can be made to the embodiments presented herein without departing from the scope of the invention. It is intended that someone can mix various aspects from the presented embodiments and remain within the scope of this disclosure. For example, this disclosure contemplates that a single element disclosed in part of a sentence of a paragraph can be implemented in a different embodiment (or claimed) apart from the other aspects of the rest of the sentence and paragraph. Likewise, an aspect of part of an embodiment shown in a FIG. can be implemented in a different embodiment (or claimed) apart from the rest of the embodiment shown in the FIG. The scope of the disclosure is not limited to the specific embodiments shown herein. Rather, this disclosure is presented in an illustrative manner to demonstrate several of many possibilities within the scope of this disclosure. The scope of the invention is not limited to the particular embodiments disclosed herein.

The invention claimed is:

1. A method of using a beverage container for insulating a beverage that is served in a disposable cup, the disposable cup having a disposable cup sidewall that is sloped to narrow the disposable cup downward and a rim located radially outward with respect to the disposable cup sidewall, the method comprising:
  providing a container body, the container body having a top end and a bottom end, the container body configured to stand on the bottom end, the container body comprising:
    a lip on the top end;
    a sidewall, the sidewall comprising an outer tubular metal sidewall and an inner tubular metal sidewall located radially inside the outer tubular metal sidewall, the sidewall having an exterior surface below the lip;
    a bottom wall, the bottom wall comprising an outer bottom metal wall and an inner bottom metal wall, the inner bottom metal wall supported by the inner tubular metal sidewall; and
    a vacuum chamber located radially between the outer tubular metal sidewall and the inner tubular metal sidewall and axially between the outer bottom metal wall and the inner bottom metal wall; and
    a hold formed by both of the bottom wall and the sidewall, wherein the container body is configured to receive the disposable cup within the hold;
  providing a retainer configured to mount on the top end of the container body, the retainer having an inner part and an outer part;
  holding the disposable cup within the hold of the container body to insulate the beverage within the disposable cup, the retainer in position mounted on the top end of the container body such that the rim of the disposable cup is located above the container body and the disposable cup sidewall extends down below the lip and into the hold while the outer part of the retainer circumferentially surrounds and engages the exterior surface of the sidewall to fix the retainer on the top of the container body and while the inner part of the retainer extends down below the lip and into the hold to engage the disposable cup sidewall, the disposable cup sidewall extending below the retainer within the hold; and
  drinking the beverage from within the disposable cup while the retainer is mounted on the top end of the container body and the disposable cup is held within the hold.

2. The method of claim 1, wherein the outer part and the inner part of the retainer are formed from one contiguous piece of material.

3. The method of claim 1, wherein holding the disposable cup within the hold of the container body comprises holding the disposable cup such that the rim of the disposable cup is directly above the lip of the container body.

4. A method of using a beverage container for insulating a beverage that is served in a disposable cup, the disposable cup having a disposable cup sidewall that is sloped to narrow the disposable cup downward and a rim located radially outward with respect to the disposable cup sidewall, the beverage container comprising a container body having a top end, a bottom end, an outer tubular sidewall, an inner tubular sidewall located radially inside the outer tubular sidewall, an outer bottom wall, an inner bottom wall that is supported by the inner tubular sidewall, an insulation chamber located radially between the outer tubular sidewall and the inner tubular sidewall and axially between the outer bottom wall and the inner bottom wall, and a hold formed by both of the inner tubular sidewall and the inner bottom wall, the beverage container further comprising a retainer configured to mount on the top end of the container body, the method comprising:
  insulating the beverage within the disposable cup with the insulation chamber by the disposable cup being within the hold while the retainer, mounted on the top end of the container body, extends downward into the hold of the container body to contact the sidewall of the disposable cup; and
  flowing the beverage from inside the disposable cup to outside of the disposable cup for drinking while the disposable cup is retained within the hold by the retainer.

5. The method of claim 4, wherein flowing the beverage comprises partially or fully inverting the container body while the disposable cup is retained within the hold by the retainer so that the beverage flows out from the disposable cup for drinking.

6. The method of claim 4, wherein the insulation chamber is a vacuum chamber.

7. The method of claim 4, further comprising mounting the retainer on the top end of the container body.

8. The method of claim 4, wherein during insulating the beverage, an outer ring of the retainer circumferentially surrounds and contacts the top end of the container body to mount the retainer on the container body.

9. The method of claim 4, wherein the retainer radially overlaps with the insulation chamber.

10. The method of claim 4, further comprising placing the disposable cup with the beverage inside of the disposable cup into the hold of the container body.

11. The method of claim 4, further comprising removing the retainer from the top end of the container body.

12. The method of claim 4, further comprising removing the disposable cup from within the hold of the container body.

13. The method of claim 4, wherein the disposable cup extends out of the hold and beyond the container body during both of insulating the beverage within the disposable cup and flowing the beverage.

14. The method of claim 4, wherein the retainer comprises an outer part and an inner part, and during both of insulating the beverage within the disposable cup and flowing the beverage, the outer part is mounted on the top end of the container body and the inner part extends into the hold to contact the disposable cup.

15. The method of claim 14, wherein the outer part and the inner part of the retainer are formed from one contiguous piece of material.

16. The method of claim 14, wherein a part of the retainer extends into the disposable cup during insulating the beverage within the disposable cup.

17. The method of claim 4, wherein the retainer is a cap.

18. The method of claim 4, wherein the retainer covers at least part of the hold of the container body when the retainer is mounted on the top end of the beverage container.

19. The method of claim 4, further comprising:
  holding the beverage directly in the hold without the disposable cup; and
  flowing the beverage out of the hold for drinking while the beverage is held directly in the hold without the disposable cup.

20. A method of using a beverage container for insulating a beverage that is served in a disposable cup, the disposable cup having a disposable cup sidewall that is sloped to narrow the disposable cup downward and a rim located radially outward with respect to the disposable cup sidewall, the beverage container comprising a container body having a top end, a bottom end, a hold, and a vacuum chamber located radially directly outward from the hold and axially directly below the hold, the beverage container further comprising a body configured to mount on the top end of the container body to retain the disposable cup, the body comprising an outer ring and an inner part, the method comprising:

mounting the body on the top end of the container body so that the outer ring of the body circumferentially surrounds the top end of the container body;

insulating the beverage in the disposable cup with the vacuum chamber by the disposable cup being within the hold while the inner part of the body extends downward into the hold of the container body to contact the sidewall of the disposable cup so that part of the vacuum chamber is directly radially between the inner part and the outer ring of the body; and flowing the beverage from inside the disposable cup to outside of the disposable cup for drinking while the disposable cup is retained within the hold by the body, wherein the disposable cup extends out of the hold and beyond the container body during both of insulating the beverage and flowing the beverage.

\* \* \* \* \*